(12) United States Patent
Tomomasa

(10) Patent No.: US 9,128,231 B2
(45) Date of Patent: Sep. 8, 2015

(54) DISPLAY DEVICE, AND TELEVISION RECEIVER

(71) Applicant: Sharp Kabushiki Kaisha, Osaka (JP)

(72) Inventor: Masatoshi Tomomasa, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/381,113

(22) PCT Filed: Feb. 22, 2013

(86) PCT No.: PCT/JP2013/054473
§ 371 (c)(1),
(2) Date: Aug. 26, 2014

(87) PCT Pub. No.: WO2013/129244
PCT Pub. Date: Sep. 6, 2013

(65) Prior Publication Data
US 2015/0042899 A1 Feb. 12, 2015

(30) Foreign Application Priority Data

Mar. 2, 2012 (JP) ................................. 2012-046495

(51) Int. Cl.
*G09F 13/04* (2006.01)
*F21V 8/00* (2006.01)
*G02F 1/1333* (2006.01)
*H04N 5/74* (2006.01)

(52) U.S. Cl.
CPC ............ *G02B 6/0091* (2013.01); *G02B 6/0085* (2013.01); *G02F 1/133308* (2013.01); *H04N 5/7408* (2013.01); *G02F 2001/133317* (2013.01); *G02F 2201/503* (2013.01)

(58) Field of Classification Search
CPC .............. G02F 2201/503; G02F 2201/133317; G02B 6/0085; G02B 6/0091; H04N 5/7408
See application file for complete search history.

(56) References Cited

U.S. PATENT DOCUMENTS

| 5,940,549 | A | * | 8/1999 | Wilde et al. ...................... 385/15 |
| 7,954,988 | B2 | * | 6/2011 | Lee et al. ........................ 362/555 |
| 8,358,447 | B2 | * | 1/2013 | Kim et al. ....................... 358/474 |
| 8,454,219 | B2 | * | 6/2013 | Byoun et al. ................... 362/613 |
| 2005/0105013 | A1 | * | 5/2005 | Nakagawa et al. ............ 349/58 |
| 2008/0094855 | A1 | * | 4/2008 | Yu et al. ......................... 362/634 |
| 2009/0237957 | A1 | * | 9/2009 | Tsubaki .......................... 362/615 |

(Continued)

FOREIGN PATENT DOCUMENTS

| JP | 2011-249330 | A | 12/2011 |
| WO | 2012/032998 | A1 | 3/2012 |

*Primary Examiner* — Ali Alavi
(74) *Attorney, Agent, or Firm* — Chen Yoshimura LLP

(57) ABSTRACT

This display device is provided with: a light source unit having a light source and a light source substrate; a display panel; a light receiving face that is disposed on the back side of the display panel, and upon which light is incident; a light guide plate having a light exiting surface that emits light toward the back side of the display panel; a wall that faces the light receiving face in such a manner that a gap is formed between the light receiving face and the wall; a light source support member that supports the light source unit, and is inserted with the light source unit in the gap etc. from the back side of the light guide plate; and an elastic member that is disposed on the light source support member, protrudes farther toward the light receiving surface than the light source, is inserted in the gap before the light source unit, and is formed of an elastic material.

20 Claims, 14 Drawing Sheets

(56) References Cited

U.S. PATENT DOCUMENTS

| | | |
|---|---|---|
| 2011/0292682 A1 | 12/2011 | Yu et al. |
| 2012/0314431 A1* | 12/2012 | Lin et al. ............ 362/382 |
| 2013/0162915 A1 | 6/2013 | Nozawa |
| 2014/0104538 A1* | 4/2014 | Park et al. ............ 349/60 |
| 2014/0118627 A1* | 5/2014 | Sasaoka ............ 348/739 |

* cited by examiner

DISPLAY DEVICE, AND TELEVISION RECEIVER

TECHNICAL FIELD

The present invention relates to a display device and a television receiver.

BACKGROUND ART

Liquid crystal panels are used in display devices for televisions, mobile telephones, personal digital assistants, and the like. A liquid crystal panel needs to use external light to display an image. Thus, as shown in Patent Document 1, this type of display device is provided with an illumination device (a so-called backlight device) to supply light to the liquid crystal panel. This illumination device is disposed on the rear surface side of the liquid crystal panel and illuminates the rear surface of the liquid crystal panel with planar light.

As the illumination device, a so-called edge lit type (or side lit type) that has a light guide plate made of a transparent plate-shaped member and a light source unit facing an edge face of this light guide plate is known as shown in Patent Document 1. Among illumination devices of this type, in recent years, a type of light source unit with a plurality of LEDs mounted on an LED substrate (hereinafter, LED unit) has been in general use.

Furthermore, as shown in Patent Document 1, the LED unit is provided within the illumination device so as to face the edge face of the light guide plate while being supported by a light source support member made of a heat dissipating member that has an L-shape in a cross-sectional view. The light source support member (heat dissipating member) has an upright portion (first heat dissipating section) that is attached to the LED unit (light-emitting module), and has a portion (second heat dissipating section) that extends from the upright portion towards the light guide plate and makes contact with the rear surface of the light guide plate. Also, this light source support member is in contact with the case portion of the illumination device. When such a light source support member is attached to the LED unit, the heat generated from the LED unit can be effectively dissipated outside using the light source support member.

However, in recent years, due to the demand for a reduction in thickness and the like, display devices without a frame-shaped member to support the periphery of the liquid crystal panel from the rear surface side have been proposed. With this type of display device, the liquid crystal panel is provided so as to be mounted on the surface in the front side of the light guide plate. Furthermore, a frame-shaped bezel covers the periphery of the liquid crystal panel from the front side of the liquid crystal panel. A display device with this kind of configuration is assembled by stacking a liquid crystal panel, a light guide plate, and the like in that order on the bezel that is upside down. The LED unit is disposed on the prescribed location on the bezel in advance before the liquid crystal panel and the like are stacked on the bezel.

However, if an LED unit is attached to a light source support member provided with a portion in contact with the rear surface of the light guide plate, the liquid crystal panel, the light guide plate, and the like cannot be stacked on the bezel after the LED unit is disposed on the prescribed location of the upside down bezel. This is because, if the light source support member is disposed on the prescribed location of the bezel in advance, a portion of the light source support member (the portion in contact with the rear surface of the light guide plate) would be protruding towards the inner side of the bezel, and the protruding portion would be caught on the liquid crystal panel, the light guide plate, and the like. In this case, the LED unit would be provided together with the light source support member on the bezel after the liquid crystal panel, the light guide plate, and the like are disposed on the bezel. The LED unit will be disposed in a gap between an edge face of the light guide plate and a wall-shaped portion of the bezel and the like facing the edge face by inserting the LED unit from the rear side of the light guide plate.

RELATED ART DOCUMENT

Patent Document

Patent Document 1: Japanese Patent Application Laid-Open Publication No. 2011-249330

Problems to be Solved by the Invention

However, when an LED unit is inserted from the rear side of the light guide plate into the gap formed between the edge face of the light guide plate and the wall-shaped portion, there is a problem that the LEDs of the LED unit may be damaged by being in contact with the edge face of the light guide plate.

SUMMARY OF THE INVENTION

The present invention aims at providing a display device and the like that suppresses the LED unit from being damaged by being in contact with the light guide plate during assembly.

Means for Solving the Problems

The display device of the present invention includes: a light source unit having a light source and a light source substrate on which the light source is mounted; a display panel having a display surface on a front side thereof; a light guide plate that is a plate shaped member disposed on a rear side of the display panel, the light guide plate having a light receiving face at an edge thereof that receives light emitted by the light source, and a light exiting surface on a front side thereof emitting light that has entered from the light receiving face towards the rear side of the display panel; a wall portion facing the light receiving face of the light guide plate with a gap therebetween; a light source support member that supports the light source unit, the light source support member being inserted into the gap between the wall portion and the light receiving face from a rear side of the light guide plate together with the light source unit; and an elastic member made of an elastic material disposed on the light source support member at a location above the light source, the elastic member being configured to protrude farther toward the light receiving face than the light source when the elastic member is inserted through and in the gap to prevent the light source from contacting the light receiving face while the elastic member is in the gap. The display device includes a light source unit having a light source and a light source substrate on which the light source is mounted. The light source unit is supported by the light source support member. Furthermore, the display device has a gap formed between the light receiving surface of the light guide plate and the wall portion. The light source support member is inserted along with the light source unit into the gap from the rear side of the light guide plate. The light source support member is provided with the elastic member made of an elastic material. The elastic member protrudes further towards the light receiving face than the light source and is inserted into the gap before the light source unit. Thus, because the elastic member that protrudes further towards the light receiving face than the light source is inserted into the gap before the light source unit is, damage caused by the light source and the light receiving surface coming into contact is suppressed.

In the display device, the elastic member may be disposed on the light source support member so as to be above a plane defined by the light exiting surface of the light guide plate when the elastic member is inserted through the gap between the wall portion and the light receiving face and the light source faces the light receiving face. In the display device, there is no portion of the light receiving surface covered by the elastic member when the elastic member is disposed on the light source support member such that the elastic member is inserted through the gap so as to be disposed towards the front side of the light guide plate when the light source faces the light receiving face. Thus, the elastic member can be prevented from blocking the light emitted by the light source from entering the light receiving face.

In the display device, the elastic member may be disposed on an edge of the light source support member that is inserted into the gap. The display device mentioned above suppresses damage to the light receiving face caused by the edge of the light source support member and the light receiving surface of the light guide plate coming into contact, as a result of the elastic member being disposed on the edge side of the light source support member inserted into the gap and protecting the edge of the light source support member with the elastic member.

In the display panel, the elastic member may have a chamfer on a side inserted into the gap. If the elastic member of the display device has a chamfer on the side that is inserted into the gap, the elastic member can be inserted into the gap more easily.

In the display device, the elastic member may be configured to be sandwiched between the wall portion and the light receiving face when the elastic member is in the gap, the elastic member being formed so as to be wider than a distance between the wall portion and the light receiving face. In the display device, if the elastic member is formed to be larger than the distance between the wall portion and the light receiving face and is also sandwiched between the wall portion and the light receiving face, then the distance between the wall portion and the light receiving face can be kept at the maximum level. Thus, contact between the light source and the light receiving face of the light guide plate can be further suppressed.

In the display device, the elastic member may have light shielding characteristics and may face an edge of the display panel. In the display device, when the elastic member has light shielding characteristics and faces an edge of the display panel, light from the light source can be suppressed from entering the edge of the display panel.

The display device of the present invention includes: a light source unit having a light source and a light source substrate on which the light source is mounted; a display panel including a display surface on a front side thereof; a light guide plate that is a plate shaped member disposed on a rear side of the display panel, the light guide plate having a light receiving face at an edge theereof that receives light emitted by the light source, and a light exiting surface on a front side thereof emitting light that has entered from the light receiving face towards the rear side of the display panel; a wall portion facing the light receiving face of the light guide plate with a gap therebetween; a light source support member that supports the light source unit, the light source support member being inserted into the gap between the wall portion and the light receiving face from a rear side of the light guide plate together with the light source unit; and an elastic sheet formed of a sheet shaped member that is elastically deformable, disposed on the light source support member at a location above the light source, the elastic sheet being configured to extend farther towards the light receiving face of the light guide plate than the light source when the elastic sheet is being inserted through and in the gap causing the elastic sheet to bend and contact the light receiving face, to prevent the light source from contacting the light receiving face while the elastic sheet is in the gap. The display device includes a light source unit having a light source and a light source substrate on which the light source is mounted. The light source unit is supported by the light source support member. Furthermore, the display device has the light receiving surface of the light guide plate and the wall portion that are forming a gap therebetween. The light source support member is inserted along with the light source unit into the gap from the rear side of the light guide plate. The light source support member is provided with elastic sheets made of elastically deformable sheet shaped members. The elastic member protrudes further towards the light receiving face than the light source and is inserted into the gap before the light source unit. Then, the elastic sheet bends so as to be interposed between the light source and the light receiving face in the gap. Thus, damage caused by the light source and the light receiving surface coming into contact is suppressed because the elastic sheet that protrudes further towards the light receiving face than the light source is inserted into the gap before the light source unit is.

In the display device, the elastic member may be disposed on the light source support member such that the elastic member is inserted through the gap so as to be disposed towards the front side of the light guide plate when the light source faces the light receiving face. In the display device, the portion of the light receiving surface being covered by the elastic member is removed when the elastic sheet is disposed on the light source support member such that the elastic sheet is inserted through the gap so as to be disposed towards the front side of the light guide plate when the light source faces the light receiving face. Thus, the elastic sheet can be prevented from blocking the light emitted by the light source from entering the light receiving face.

In the display device, the elastic sheet may be disposed on an edge of the light source support member that is inserted into the gap. The display device mentioned above suppresses damage to the light receiving face caused by the edge of the light source support member and the light receiving surface of the light guide plate coming into contact, as a result of the elastic sheet being disposed on the edge side of the light source support member inserted into the gap and protecting the edge of the light source support member with the elastic sheet.

In the display device, the adhesive sheet may have light shielding characteristics. In the display device, if the elastic sheet has light shielding characteristics, light leakage to the outside from between the light receiving surface and the light source unit can be suppressed by the elastic sheet.

The display device may further include a frame that includes a contact part disposed on a periphery of the display surface of the display panel, an opposing portion that extends farther outward from the contact part than the light receiving face, and an outer wall formed of the wall portion that extends from the opposing portion. The display device may further include: a frame that includes a contact part disposed on a periphery of the display surface of the display panel; an opposing portion that extends farther outward from the contact part than the light receiving face; and an outer wall formed of the wall portion that extends from the opposing portion.

The display panel may further include an optical member that is interposed between the display panel and the light guide plate, the optical member allowing the light emitted from the light exiting surface to pass through to the display panel.

In the display device, the light source support member may have a light source attachment section where the light source substrate is attached, and a heat dissipating section that extends from a light source attachment section towards the light receiving face and that is disposed on a rear surface of the light guide plate.

In the display device, the display panel may be a liquid crystal panel having liquid crystal sealed between a pair of substrates.

A television receiver according to the present invention includes the display device.

Effects of the Invention

According to the present invention, a display device and the like that can suppress the light guide plate from being damaged during assembly by the LED unit and the light guide plate coming into contact can be provided.

DETAILED DESCRIPTION OF EMBODIMENTS

<Embodiment 1>

Figure 3:
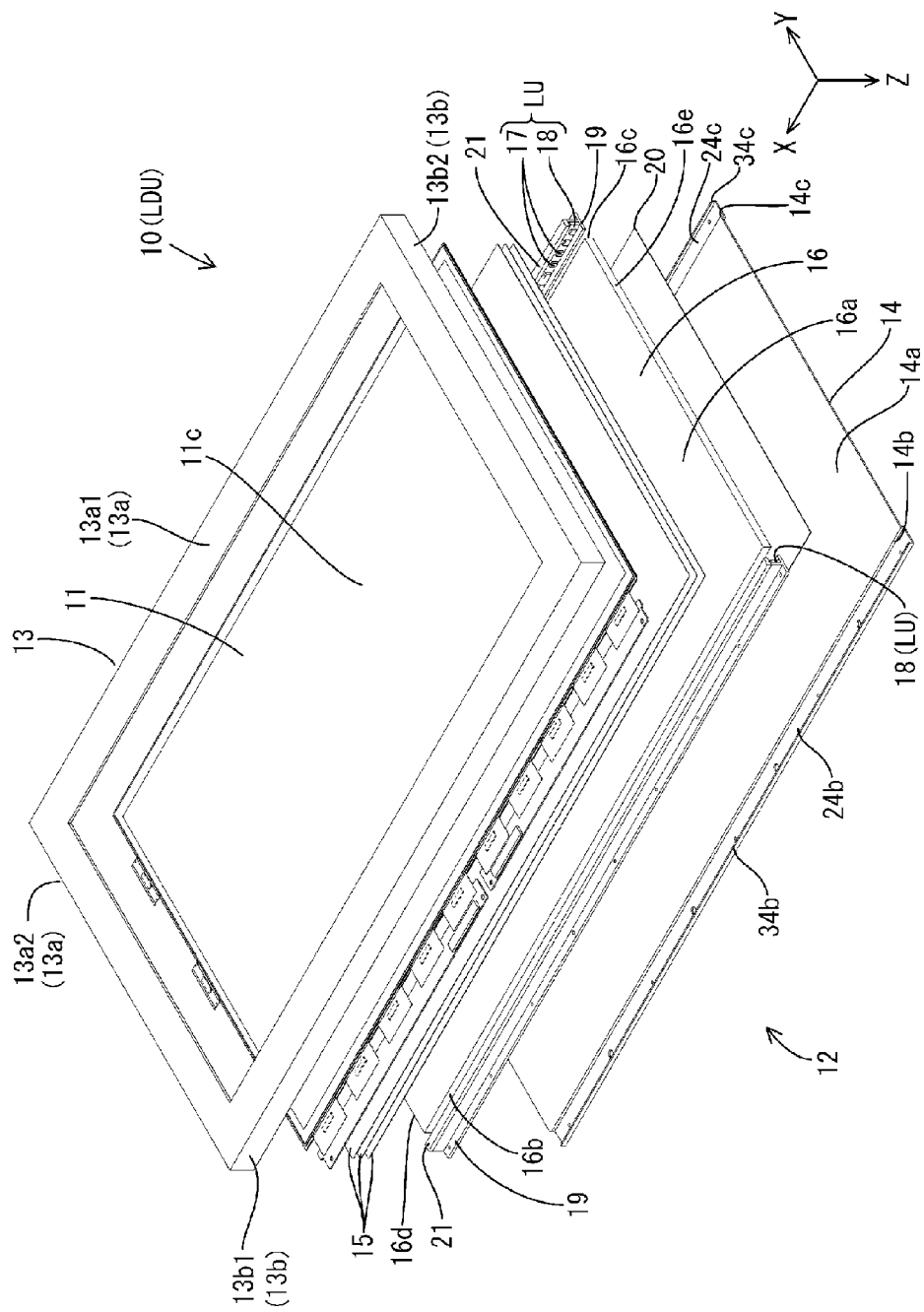
FIG. 3 is an exploded perspective view showing a schematic configuration of a liquid crystal display unit that constitutes a part of the liquid crystal display device.
Figure 4:
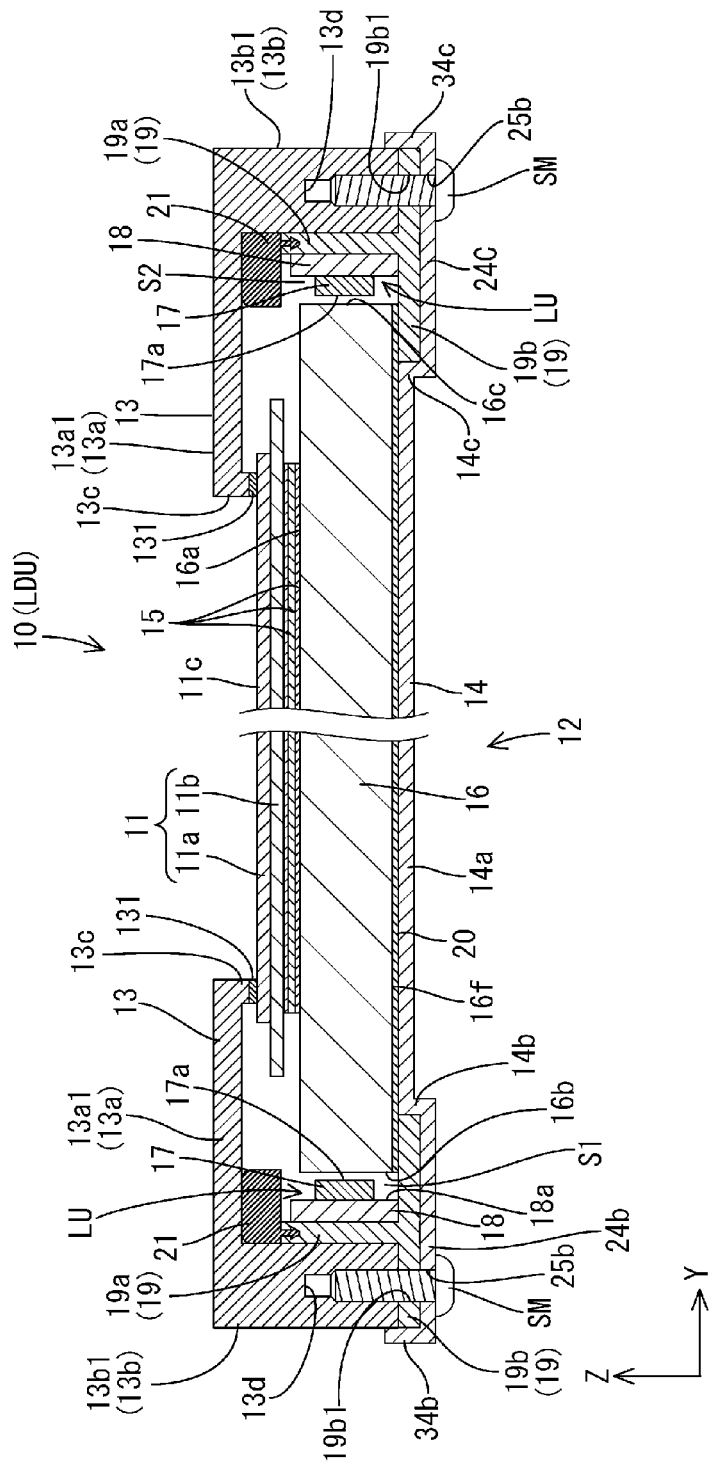
FIG. 4 is a cross-sectional view that shows a cross-sectional configuration of the liquid crystal display device along the shorter side direction.

Embodiment 1 of the present invention will be explained below with reference to FIGS. 1 to 7. In the present embodiment, a television receiver TV and a liquid crystal display device 10 will be described as examples. The respective drawings have an X axis, a Y axis, and a Z axis, and the drawings are depicted such that the directions of the axes in the respective drawings match. Furthermore, the upper side in FIGS. 3 and 4 is the front side (display surface side), and the lower side is the rear side (rear surface side).

Figure 1:
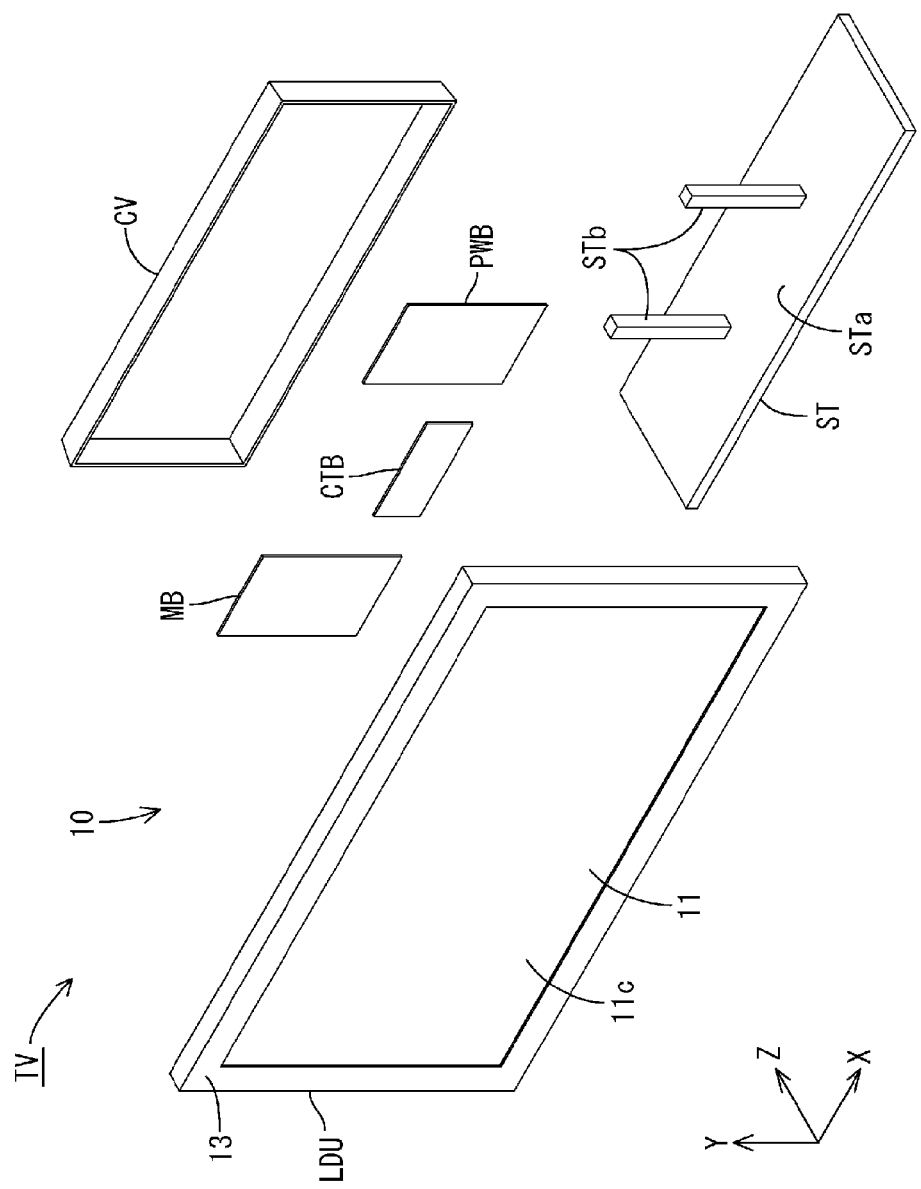
FIG. 1 is an exploded perspective view of a schematic configuration of a television receiver according to Embodiment 1 of the present invention.
Figure 2:
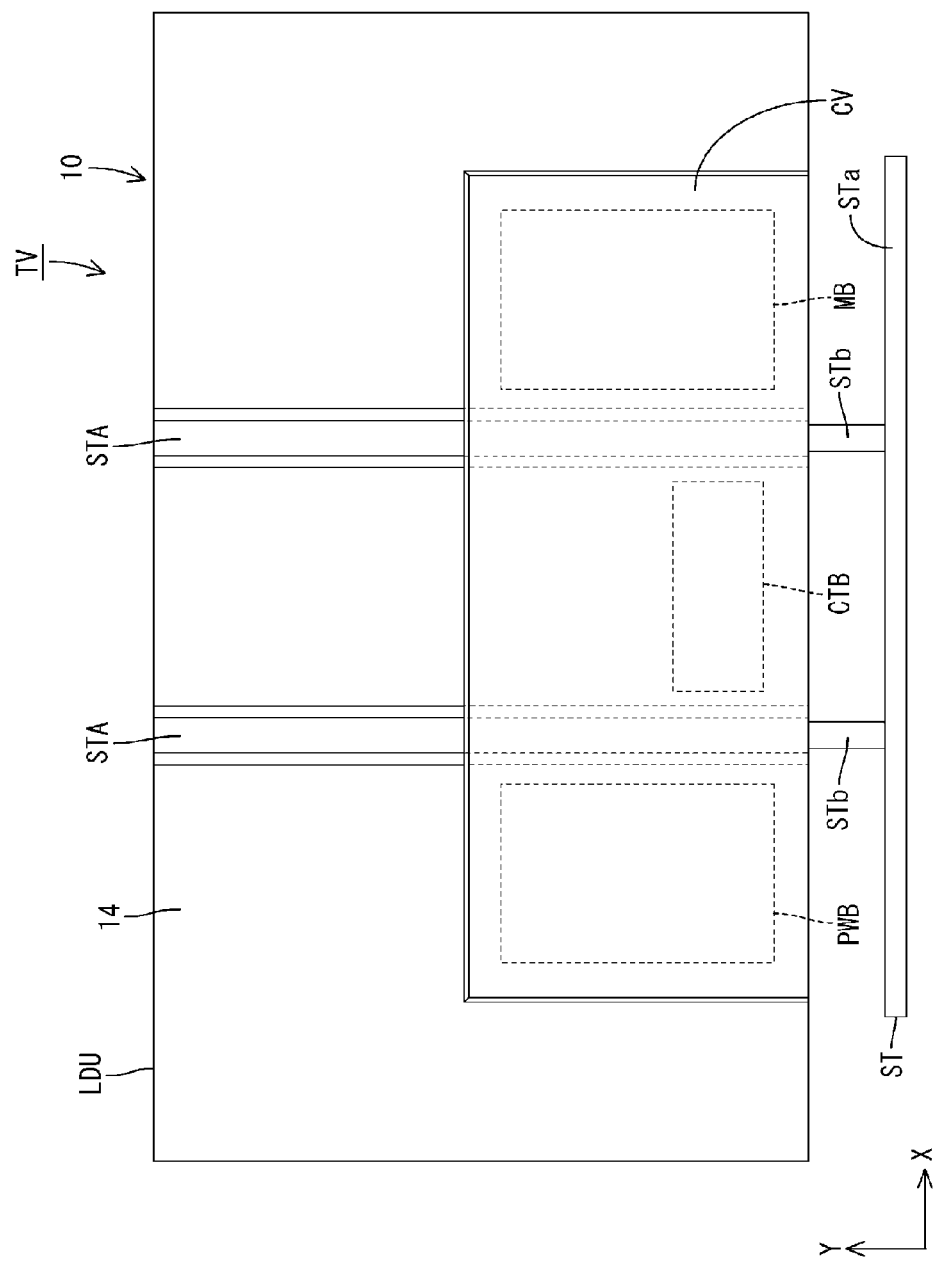
FIG. 2 is a rear view of the television receiver.

FIG. 1 is an exploded perspective view showing a schematic configuration of the television receiver TV according to Embodiment 1 of the present invention, and FIG. 2 is a rear view of the television receiver TV. As shown in FIG. 1, the television receiver of the present embodiment includes: a liquid crystal display unit LDU; various types of boards PWB, MB, and CTB attached to the rear side (rear surface side) of this liquid crystal display unit LDU; a cover member CV attached to the rear side of the liquid crystal display unit LDU and covering the various types of boards PWB, MB, and CTB; and a stand ST. The liquid crystal display unit LDU is supported by the stand ST such that a display surface $11c$ of the liquid crystal display unit LDU is disposed along the vertical direction (the Y axis direction).

The liquid crystal display device 10 of the present embodiment is the portion excluding at least the configuration for receiving television signals (such as a tuner part of the main board MB) from the television receiver TV having the above-mentioned configuration. The liquid crystal display unit LDU has a horizontally-long rectangular shape with a liquid crystal display panel 11 as a display panel and a backlight device (illumination device) 12 as an external light source. These are integrally held together by a frame 13 and a chassis 14, which are external members that constitute the exterior of the liquid crystal display device 10.

As shown in FIG. 2, on the rear of the chassis 14 that constitutes the rear exterior of the liquid crystal display device 10, a pair of stand attachment members STA extending along the Y axis direction is attached at two locations that are separated from each other along the X axis direction. The cross-sectional shape of these stand attachment members STA is a substantially channel shape that opens towards the chassis 14, and a pair of support columns STb of the stand ST is inserted into respective spaces formed between the stand attachment members STA and the chassis 14, respectively. Wiring members (such as electric wires) connected to an LED substrate 18 of the backlight device 12 run through a space inside of the stand attachment members STA. The stand ST is constituted of a base STa that widens along the X axis direction and the Z axis direction, and the pair of support columns STb standing on the base STa along the Y axis direction. The cover member CV is made of a synthetic resin and is disposed over the pair of stand attachment members STA in the X axis direction while covering approximately the bottom half (see FIG. 2) of the rear of the chassis 14. Between the cover member CV and the chassis 14, a space is provided where the components described later such as the various boards PWB, MB, and CTB can be housed.

As shown in FIG. 2, the various boards PWB, MB, and CTB include a power supply board PWB, a main board MB, and a control board CTB. The power supply board PWB is a power supply source for the liquid crystal display device 10, and supplies driving power to the other boards MB and CTB, LEDs 17 of the backlight device 12, and the like. The main board MB has a tuner (not shown) capable of receiving television signals and an image processor (not shown) that processes the received television signals. The processed image signals are outputted to the control board CTB. When the liquid crystal display device 10 is connected to an external image-reproduction device (not shown), the image signal from the image-reproduction device is inputted to the main board MB and processed at the image processor. The processed signal is outputted to the control board CTB. The control board CTB has the function of converting the image signal inputted from the main board MB to a signal for driving liquid crystal, and supplying the converted signal for liquid crystal driving to the liquid crystal panel 11.

Figure 5:
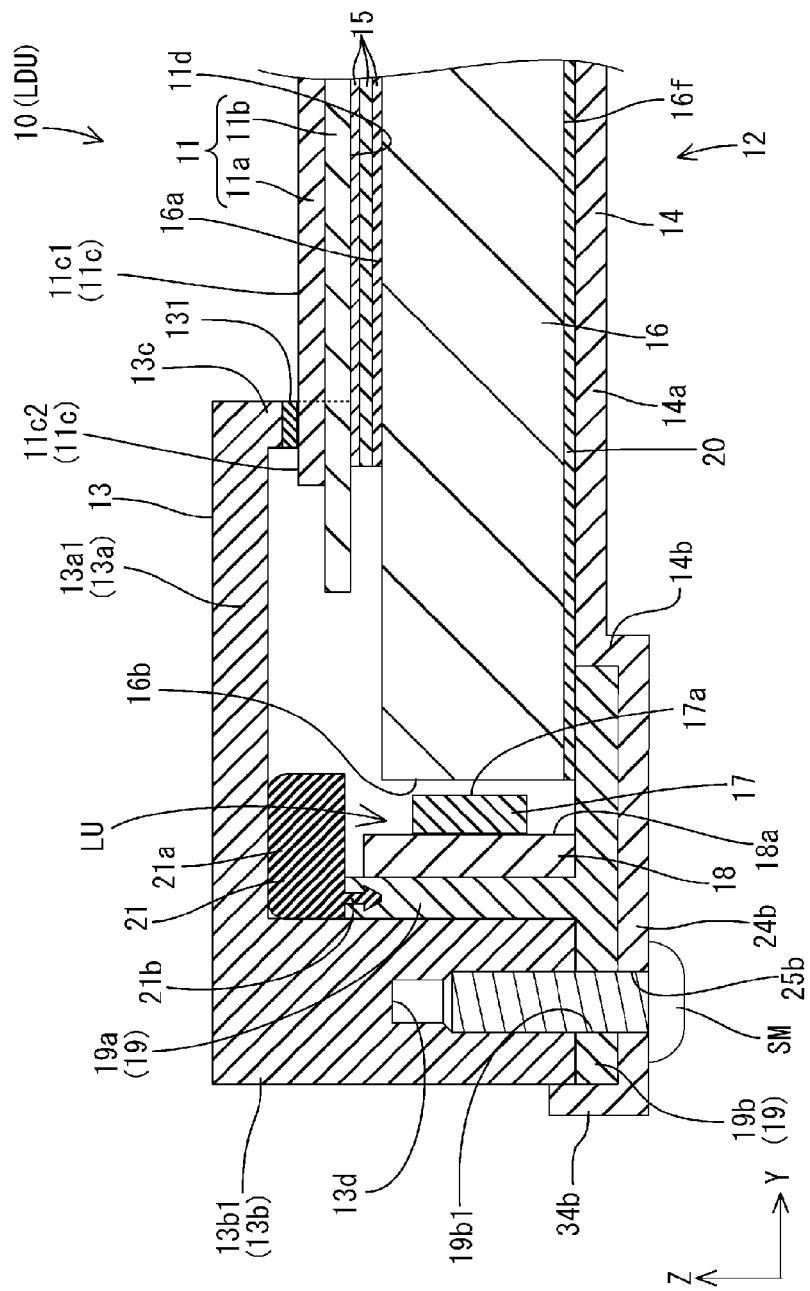
FIG. 5 is a magnified cross-sectional view of the liquid crystal display device shown in FIG. 4.

FIG. 3 is an exploded perspective view showing a schematic configuration of the liquid crystal display unit LDU that constitutes a part of the liquid crystal display device 10, FIG. 4 is a cross-sectional view that shows a cross-sectional configuration of the liquid crystal display device 10 along the shorter side direction, and FIG. 5 is a magnified cross-sectional view of the liquid crystal display device shown in FIG. 4. As shown in FIGS. 3 to 5, the main constituting components of the liquid crystal display unit LDU, which forms a portion of the liquid crystal display device 10, are housed in a space between the frame (front frame) 13 provided on the front side and the chassis (rear chassis) 14 provided on the rear side. The main components housed between the frame 13 and the chassis 14 include at least: the liquid crystal panel 11, optical members 15, the light guide plate 16, the LED units (light source unit) LU, a light source support member (heat dissipating member) 19, a reflective sheet 20, and an elastic member 21. Of these, the liquid crystal panel 11, the optical members 15, the light guide plate 16, and the reflective sheet 20 are stacked one on top of the other and held between the frame 13 on the front side and the chassis 14 on the rear side. The backlight device is mainly constituted of the optical members 15, the light guide plate 16, the LED unit LU, the light source support member 19, the elastic member 21, the chassis 14, and the reflective sheet 20. The LED units LU are supported by the light source support member 19, and are disposed between the frame 13 and the chassis 14 along the edge faces 16b and 16c on one long-side of the light guide plate 16 supported by the light source support member 19. The LED unit LU is provided with LEDs (LED light source) 17 that are a light source and an LED substrate (light source substrate) 18 on which the LEDs 17 are mounted. The elastic member 21 is attached to the light source support member 19.

The liquid crystal panel 11 has a horizontally-long rectangular shape in a plan view as shown in FIG. 3 and the like. The liquid crystal panel 11 has a configuration in which a pair of glass substrates 11a and 11b having high light transmittance are bonded to each other while having liquid crystal sealed between the two substrates 11a and 11b. Of the two substrates 11a and 11b, one on the front side (front surface side) is a color filter substrate 11a, and the other on the rear side (rear surface 11d side) is an array substrate 11b. On the array substrate 11b, switching elements (thin film transistors, TFTs, for example) connected to source wiring lines and gate wiring lines that are intersecting with each other, pixel electrodes connected to the switching elements, an alignment film, and the like are provided. On the other hand, the CF substrate 11a is provided with colored filters each having a colored portion such as R (red), G (green), B (blue), and the like disposed in parallel, an opposite electrode, an alignment film, and the like. Polarizing plates (not shown) are respectively provided on outer sides of the two substrates 11a and 11b.

As shown in FIG. 4, of the pair of the substrates 11a and 11b that constitutes a part of the liquid crystal panel 11, the array substrate 11b is formed to be larger than the CF substrate 11a in a plan view. The array substrate 11b is disposed such that an edge portion thereof protrudes toward the outside beyond the CF substrate 11a. Specifically, the array substrate 11b is formed to be larger than the CF substrate 11a such that the entire periphery of the outer edges of the array substrate protrudes outside further beyond the outer edges of the CF substrate 11a. As shown in FIGS. 3 to 5, the liquid crystal panel 11 is stacked on the front side (light exiting side) of the optical members 15 described below. The rear side surface (rear surface 11d) of the liquid crystal panel 11 is in close contact with the optical members 15 with almost no gap therebetween. The display surface (surface on the front side) 11c of the liquid crystal panel 11 is constituted of a display region 11c1 that is in the center of the screen and that can display images, and a non-display region 11c2 that is in the outer edges of the screen and that is formed in a frame shape surrounding the display region 11c1. The liquid crystal panel 11 is connected to the control board CTB via a driver part for the liquid crystal and a flexible substrate, and based on signals inputted from the control board CTB, images are displayed in the display region 11c1 on the display surface 11c.

As shown in FIG. 3, the optical members 15 have a horizontally-long rectangle shape in a plan view as shown in FIG. 3 and the like. The size (the shorter side dimensions and longer side dimensions) of the optical members 15 is set to be similar to the liquid crystal panel 11. The optical members 15 are stacked on the front side (side from which light is emitted) of the light guide plate 16 described below, and are sandwiched between the liquid crystal panel 11 described above and the light guide plate 16. The optical members 15 include three sheets stacked one on top of another. Specific examples of an optical member 15 include a diffusion sheet, a lens sheet, a reflective polarizing sheet, and the like, for example, and it is possible to appropriately choose any of these as optical members 15.

The light guide plate 16 is made of a synthetic resin (an acrylic resin such as PMMA or a polycarbonate, for example) with a higher refractive index than air and almost completely transparent (excellent light transmission). As shown in FIG. 3, the light guide plate 16 has a horizontally-long rectangular shape similar to the liquid crystal panel 11 and the optical members 15. The light guide plate 16 is configured to have a greater thickness than the optical members 15, described later. Also, the longer side direction of the main surface (surfaces 16a and 16f) of the light guide plate 16 matches the X axis direction, the shorter side direction thereof matches the Y axis direction and the plate thickness direction intersecting with the main surface corresponds to the Z axis direction. As shown in FIGS. 4 and 5, the light guide plate 16 is configured to be larger (shorter side dimension and longer side dimension) than the liquid crystal panel 11 when viewed from the front. An edge portion of the light guide plate 16 is disposed within the display device 10 so that the edge portion thereof protrudes toward the outside beyond the edge portion of the liquid crystal panel 11.

The light guide plate 16 is formed to be slightly larger than the liquid crystal panel 11 such that the edges thereof protrude further out than all of the peripheral edges of the array substrate 11b of the liquid crystal panel 11. The light guide plate 16 is placed on the rear side of the optical members 15, and is sandwiched between the optical members 15 and the chassis 14. Towards the outside of the two edge faces 16b and 16c on the long-side of the light guide plate 16, the LED unit LU supported by the light source support member 19 is provided, and the light from the LED unit LU enters the light guide plate 16 through the edge faces 16b and 16c. The light guide plate 16 has the function of guiding therethrough the light of the LED unit LU that has entered from the respective longer-side edge faces and emitting the light toward the optical members 15 (front side).

Of the main surfaces of the light guide plate 16, the front surface (surface facing the optical members 15) is a light exiting surface 16a where light exits from the interior towards the optical members 15 and the liquid crystal panel 11. Of the peripheral edge faces adjacent to the main surface (surface 16a and the like) of the light guide plate 16, both edge faces of the light guide plate 16 in the long side direction along the X axis (both edge faces of the respective edges in the short side direction) are light receiving faces 16b and 16c that directly face the respective LEDs 17 (LED substrates 18) with prescribed gaps therebetween and that receive light emitted from the LEDs 17. The light receiving faces 16b and 16c are disposed in parallel along the X axis direction and the Z axis direction (main surfaces of the LED substrates 18), and are substantially perpendicular to the light exiting surface 16a. Furthermore, among the peripheral edge faces of the light guide plate 16, the shorter edge faces 16d and 16e on the shorter sides are each disposed in parallel with each other along the Y axis direction and the Z axis direction, and are substantially perpendicular to the light exiting surface 16a.

The reflective sheet 20 for reflecting light in the light guide plate 16 to the light exiting surface 16a is provided on the rear side of the light guide plate 16. The reflective sheet 20 is provided so as to cover the entire surface 16c on the rear side of the light guide plate. Also, the reflective sheet 20 is disposed in the display device 10 so as to be sandwiched between the chassis 14 and the light guide plate 16. The reflective sheet 20 is a sheet made of synthetic resin (a foamed polyethylene terephthalate sheet, for example), and the surface thereof is a highly reflective white. As shown in FIG. 4, the shorter side dimension of the reflective sheet 20 is formed to be larger than the shorter side dimension of the light guide plate 16, and both edge portions of the reflective sheet 20 protrude farther towards the LEDs 17 than light receiving faces 16b and 16c.

Furthermore, at least one of the light exiting surface 16a of the light guide plate 16, or the rear surface 16f is patterned so as to have a reflective part (not shown) that reflects internal light or a diffusion part (not shown) that diffuses internal light to attain a prescribed planar distribution. These control the light emitted from the light exiting surface 16a to have an even distribution in the horizontal direction.

Next, the LEDs 17 and the LED substrate 18 constituting the LED unit LU will be described. As shown in FIGS. 3 to 5, the LEDs 17 of the LED units LU have a configuration in which an LED chip is sealed with a resin on a substrate part that is affixed to the LED substrate 18. The LED chip mounted on the substrate part has one primary light-emitting wavelength. Specifically, an LED chip that only emits blue light is used. The resin that seals the LED chip has a fluorescent material dispersed therein, the fluorescent material emitting light of a prescribed color by being excited by the blue light emitted from the LED chip. The resin is formed such that white light is emitted overall. As the fluorescent material, a yellow fluorescent material that emits yellow light, a green fluorescent material that emits green light, and a red fluorescent material that emits red light, for example, can be appropriately combined, or one of them can be used on its own. Each of the LEDs 17 is of a so-called top-emitting type in which the side opposite to that mounted onto the LED substrate 18 (side facing the light receiving surface 16b and 16c of the light guide plate 16) is the primary light-emitting surface.

As shown in FIGS. 3 to 5, the LED substrates 18 are each formed in a narrow plate shape (belt-shape, elongated) that extends along the longer side direction (X axis direction, lengthwise direction of the light receiving surface 16b, 16c) of the light guide plate 16. The LED substrate 18 is housed within the frame 13 and the chassis 14 in which the main surface is disposed along the X axis direction and the Z axis direction (in other words, parallel to the light receiving faces 16b and 16c). The LED substrate 18 is configured so that the lengthwise direction (dimensions) of the LED substrate is approximately half that of the light guide plate 16. The LEDs 17 are mounted on the surface of a surface (mounting surface) 18a facing the light guide plate 16. The LEDs 17 are aligned in a row with prescribed gaps therebetween on the mounting surface 18a of the LED substrate 18, in the length direction thereof (X axis direction). Also, the rows of LEDs 17 are aligned in parallel with each other along the lengthwise direction of the light guide plate 16. The gaps between the LEDs 17 adjacent to each other in the X axis direction (namely, the array pitch of the LEDs 17) are substantially similar. The alignment direction of the LEDs 17 coincides with the length direction (X axis direction) of the LED substrates 18.

Wiring patterns (not shown) made of a metal film (copper foil or the like) are formed on the mounting surface 18a of each of the LED substrates 18, and these wiring patterns extend along the lengthwise direction (X axis direction) across the group of LEDs 17 to connect the adjacent LEDs 17 in series. The terminals formed at both edges of these wiring patterns are connected to the power supply board PWB through wiring line members such as connectors or electric lines, thereby supplying driving power to the respective LEDs 17. Because the pair of LED substrates 18 disposed across the light guide plate 16 is housed between the frame 13 and the chassis 14 such that the respective mounting surfaces 18a for the LEDs 17 face each other, the primary light-emitting surfaces 17a of the respective LEDs 17 that are mounted on the respective LED substrates 18 of each pair face each other, and the optical axis of each LED 17 substantially coincides with the Y axis direction. The base member of the LED substrate 18 is made of a metal such as aluminum, for example, and the above-described wiring pattern (not shown) is formed on the surface via an insulating layer. Also, a white solder mask (not shown) is formed on the insulating layer so as to cover the wiring patterns. The base material of the LED substrate 18 can alternatively be formed of an insulating material such as a ceramic.

The light source support member (heat dissipating member) 19 is made of a metal with excellent thermal conductivity, such as aluminum. The light source support member 19 has an LED attachment section (light source attachment section) 19a and a long and thin plate-shaped heat dissipating section 19b that is in contact with the surface of the chassis 14, these sections being perpendicular to each other and having a substantially T shape in a cross-sectional view as a whole. The light source supporting member 19 is configured such that the length (length in the lengthwise direction) is substantially the same as the length (length in the lengthwise direction) of the LED substrates 18. The LED attachment section 19a has a plate shape parallel to the light receiving faces 16b and 16c of the light guide plate 16 and the surface 18a of the LED substrate 18. Each figure is drawn such that the longer side direction of the LED attachment section 19a matches the X axis direction, the shorter side direction matches the Z axis direction, and the thickness direction matches the Y axis direction. The LED substrate 18 is attached to the surface (in other words, the surface facing the light guide plate 16) towards the inner side of the LED attachment section 19a.

The longer side dimension (length in the lengthwise direction) of the LED attachment section 19a is configured to be substantially the same as the longer side dimension (length in the lengthwise direction) of the LED substrate 18, but the shorter side dimension (length in the short side direction) thereof is larger than the shorter side dimension (length in the short side direction) of the LED substrate 18. The respective edges of the LED attachment section 19a in the shorter side direction protrude outward beyond the respective edges of the LED substrate 18 along the Z axis direction.

The outer surface of the LED attachment section 19a (that is, the surface opposite to the surface on which the LED substrate 18 is attached) faces an outer wall 13b (13b1) of the frame 13, which will be later described. Thus, the LED attachment section 19a is disposed in the display device 10 between the outer wall 13b (13b1) of the frame 13 and the light guide plate 16. The LED attachment section 19a rises towards the front side (towards the frame 13 side) along the Z axis direction (the direction in which the liquid crystal panel 11, the optical members 15, and the light guide plate 16 are stacked) from approximately the center portion in the shorter side direction of the heat dissipating section 19b. As described below, an elastic member 21 is attached to an edge 19a1 on the front side (upper side) of the LED attachment section 19a.

The heat dissipating section 19b has a plate shape aligned in parallel with the surface of the chassis 14. Each figure indicates that the longer side direction of the heat dissipating section 19b matches the X axis direction, the shorter side direction thereof matches the Y axis direction, and the thickness direction thereof matches the Z axis direction. The heat dissipating section 19b is formed to protrude towards the edge (edge on the chassis 14 side) of the rear side (bottom side) of the LED attachment section 19a inwards (towards the light guide plate 16) along the Y axis direction, and the heat dissipating section protrudes towards the outside (towards the side opposing the light guide plate 16). The longer side dimension of the heat dissipating section 19b is substantially the same as that of the LED attachment section 19a. The rear surface (bottom side) of the heat dissipating section 19b (in other words, the surface facing the chassis 14) makes surface-to-surface contact with the surface of the chassis 14. Furthermore, the front side (upper side) of the surface of the heat dissipating section 19b protruding outward is in contact with the bottom edge surface of the outer wall 13b (13b1) of the frame 13 that is later described. Thus, the portion protruding towards the outside of the heat dissipating section 19b is disposed between the outer wall 13b (13b1) of the frame 13 and the chassis 14 so as to be sandwiched (interposed). The front side (upper side) of the surface of the heat dissipating section 19b protruding inwards is disposed on the rear surface 16f of the light guide plate 16 through the reflective sheet 20. The portion of the heat dissipating section 19b protruding inward is provided on the edge of the surface 16f along the lengthwise direction of the light receiving faces 16b and 16c. Thus, the portion of the heat dissipating section 19b protruding inward is sandwiched between the light guide plate 16 and the chassis 14. The heat generated by lighting the LEDs 17 is transferred to the frame 13 having the chassis 14 and the outer wall 13b (13b1) through the LED attachment section 19a and the heat dissipating section 19b. In this manner, the heat from the LEDs 17 is effectively dissipated to the outside of the liquid crystal display device 10 which suppresses heat buildup in the device. The portion of the heat dissipating section 19b that protrudes towards the outside is provided with an insertion hole 19b1 where a screw is inserted. The heat dissipating section 19b is fixed to the outer wall 13b (13b1) of the frame with the screw SM.

Figure 6:
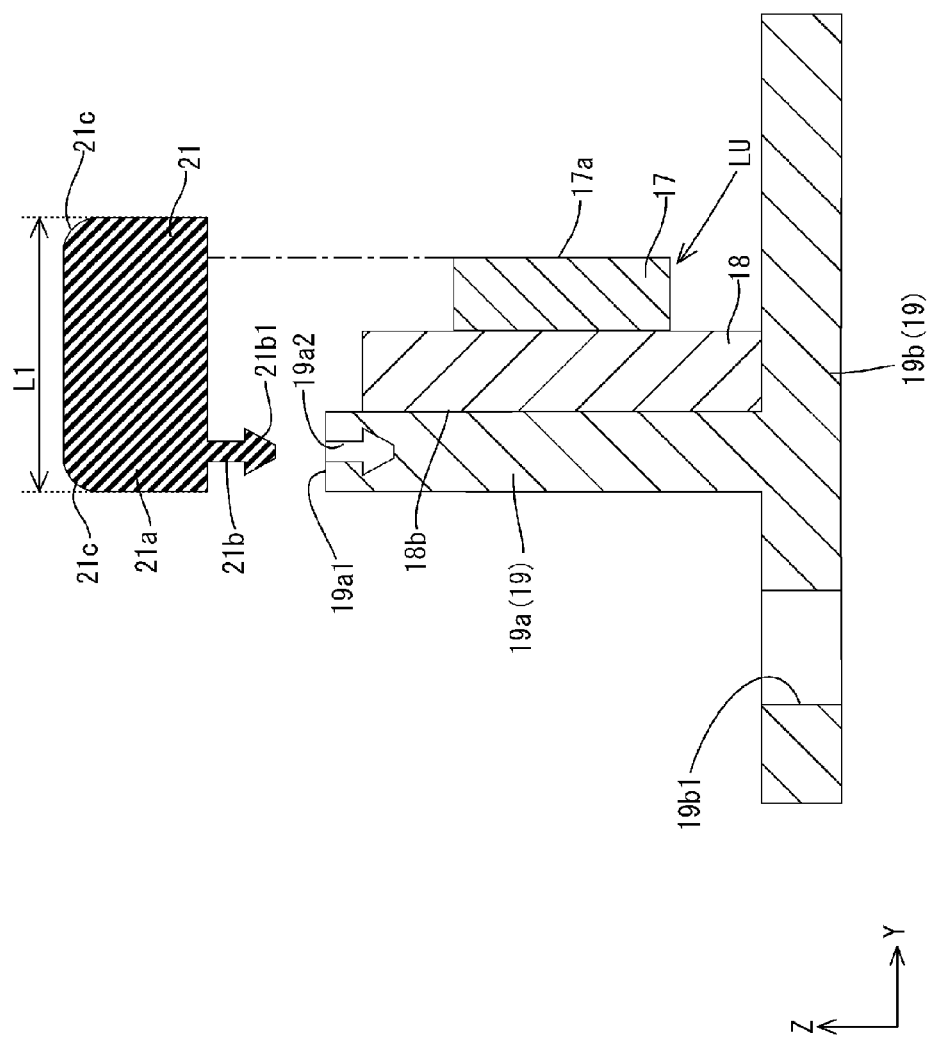
FIG. 6 is a cross-sectional view of the LED unit and the elastic member.

The elastic member 21 is formed by forming elastic material such as natural rubber and synthetic rubber into a prescribed shape. FIG. 6 is a cross-sectional view of the LED unit LU and the elastic member 21 that are supported by the light source support member 19. As shown in FIG. 6, the elastic member 21 is attached to the edge 19a1 at the front side (upper side) of the light source support member 19. The elastic member 21 is used to dispose the LED unit LU supported by the light source support member 19 on a prescribed location of the display device 10 as described later. As a whole, the elastic member 21 has a long and narrow shape extending along the lengthwise direction of the light source support member 21. The length (length in the X axis direction) of the elastic member 21 is set to be substantially the same as the length (length in the lengthwise direction) of the light source support member 21. The elastic member 21 is provided with a main body 21a and a fixture 21b.

The main body 21a is a large portion of the elastic member 21 and is provided on the edge 19a1 of the light source support member 19. The main body 21a has an elongated columnar shape extending along the lengthwise direction (X axis direction) of the light source support member 19. Furthermore, the main body 21a has a shape (so-called eave shape) protruding towards the light guide plate 16 from the light source support member 19 so as to cover the LED unit LU from the upper side (front side). As shown in FIG. 6, the rear surface 18b of the LED substrate 18 provided on the side opposite to the mounting surface 18a is fixed to the LED attachment section 19a of the light source support member 21. The elastic member 21 (main body 21a) that is provided further towards the outside than the rear surface 18b is provided on top of the edge 19a1 of the LED attachment section 19a. Furthermore, the main body 21a of the elastic member 21 has a shape that protrudes towards the light guide plate 16 from the portion on the edge 19a1. The portion protruding towards the light guide plate 16 is formed so as to protrude towards the light guide plate 16 (inward) over the LEDs 17 mounted on the mounting surface 18a of the LED substrate 18. The width (length in the short side direction) L1 of the main body 21a is set to be larger than the gap formed between the outer wall 13b of the frame 13 described later and the edge face 16b (or edge face 16c) of the light guide plate 16. The portion of the edge face on the outer side of the elastic member 21 (main body 21a) that is on the edge 19a1 of the LED attachment section 19a is disposed so as to be substantially on the same surface as the edge face on the outer side of the LED attachment section 19a.

The fixture 21b extends from the main body 21a of the elastic member 21 that is on the edge 19a1 of the LED attachment section 19a and protrudes towards the bottom (rear side). This fixture 21b extends along the lengthwise direction of the light source support member 19. This fixture 21b is inserted in a hole 19a2 that is drilled in the edge 19a1 of the LED attachment section 19a, and the fixture 21b fits in the hole 19a2. The elastic member 21 is fixed to the light source support member 19 by fitting the fixture 21b into the hole 19a2. The hole 19a2 is formed in a trench shape extending extensively along the lengthwise direction of the light source support member 19. The bottom side of the hole 19a2 has a cross-sectional shape that is in an upside down trapezoid shape. The bottom side of the hole 19a2 has a wider trench than the entrance side. Meanwhile, the lower edge 21b1 of the fixture 21b has an upside down cross-sectional trapezoid shape that gradually widens from the tip side (bottom side) to the root side (top side). When the lower edge 21b1 is held in the bottom side of the hole 19a2, the fixture 21b is suppressed from leaving (being pulled out of) the hole 19a2 as the fixture 21b is engaged with the surrounding of the hole 19a2. The two edges (chamfers) 21c on the upper side (front side) of the elastic member 21 (main body 21a) are chamfered in a curved shape. In the present embodiment, the elastic member 21 is made of hard rubber. Furthermore, the elastic member 21 is black and has light shielding characteristics (light absorbing characteristics).

Next, the configuration of the frame 13 and the chassis 14 will be explained. The frame 13 and the chassis 14 are both made of metal such as aluminum, and have high mechanical strength (rigidity), high heat conductivity, and the like. The frame 13 and the chassis 14 house the LED unit LU supported by the light source support member 19, and sandwiches a layered body including the liquid crystal panel 11, the optical members 15, the light guide plate 16, and the reflective sheet 20 from the front side and the rear side.

As shown in FIGS. 3 to 5, the frame 13 has a horizontally-long rectangular shape as a whole, and has a frame shape that surrounds the display region 11c1 of the display surface 11c of the liquid crystal panel 11. The frame 13 is mainly provided with an opposing part 13a in a frame shape disposed on the front side of the liquid crystal panel 11, the outer wall 13b extending from the outer edge portion of the opposing part 13a towards the chassis 14, and a contact part 13c provided on the non-display region 11c2 disposed on the surrounding edge of the display region 11c1 protruding to the liquid crystal panel 11 from the inner edge of the opposing part 13a.

The opposing part 13a is divided into two parts, a long side opposing part 13a1 disposed on the long side of the frame 13 and a short side opposing part 13a2 disposed on the short side of the frame. The outer wall 13b is divided into two parts: a long side outer wall disposed on the long side of the frame 13 and a short side outer wall disposed on the short side of the frame. Furthermore, the two long side portions of the frame 13 have the same overall structure. Also, the two short side portions of the frame 13 have the same overall structure.

The opposing part 13a is provided so as to cover the non-display region 11c2 disposed on the front side of the liquid crystal panel 11. The opposing part 13a extends from the contact part 13c towards the outside (outer edge of the frame 13) and opposes protruding plates 24b and 24c. The long side opposing part 13a1 and the short side opposing part 13a2 are spread along the plate face (plate face of the liquid crystal panel 11) of the chassis 14 as a whole and have a plate shape with a prescribed thickness.

The long side opposing part 13a1 has a contact part 13c in the long side, which presses the edge (non-display region 11c2) of the liquid crystal panel 11 in the long side from the front side towards the chassis 14 (light guide plate 16) side. The contact part 13c of the long side is elongated along the longer side direction of the frame 13 (opposing part 13a). The protruding tip portion 131 of the contact part 13c of the long side is formed of an elastic body (black rubber elastic body, for example) that shields light. The tip portion 131 of the contact part 13c1 of the long side is configured so as to be formed in the non-display region 11c2 of the liquid crystal panel 11.

The short side opposing part 13a2 has a contact part 13c in the short side, which presses the edge (non-display region 11c2) of the liquid crystal panel 11 in the short side from the front side towards the chassis 14 (light guide plate 16) side. The contact part 13a of the short side is elongated along the shorter side direction of the frame 13 (opposing part 13a). The protruding tip portion 131 of the contact part 13c of the short side is formed of an elastic body (black rubber elastic body, for example) that blocks light like the long side. The tip portion 131 of the contact part 13c1 of the short side is configured so as to be formed in the non-display region 11c2 of the liquid crystal panel 11. The edge (end) of the contact part 13c in the elongated shorter side provided on the short side opposing part 13a2 is connected to the edge (end) of the contact part 13c in the longer side provided on the long side opposing part 13a1. Thus, the contact part 13c as a whole has a frame shape provided on the non-display region 11c2 while also surrounding the display region 11c1 of the liquid crystal panel 11.

The outer wall 13b as a whole surrounds the liquid crystal panel 11 and has a frame shape (angular enclosure) that extends from the opposing part towards the chassis 14. The outer wall 13b is provided on the outer edge portion of the opposing part 13a. The outer wall 13b is disposed so as to surround the edge faces of the layered objects including the liquid crystal panel 11, the optical members 15, the light guide plate 16, and the reflective sheet 20.

As shown in FIGS. 4 and 5, the longer side outer wall 13b1 has a plate shape (wall shape) with a prescribed thickness that extends straight towards the bottom (chassis 14 side) from the outer edge portion of the long side opposing part 13a1. There are gaps S1 and S2 between the longer side outer wall 13b1 and the edge faces (light receiving faces) 16b and 16c. The LED units LU are provided in the gaps S1 and S2 respectively, the gaps being supported by the light source support member 19. A groove 13d where the screw SM can be screwed in is formed in the bottom edge portion (end) of the longer side outer wall 13b1. When the screws SM are screwed into the groove 13d while also penetrating screw holes 25a and 25b and the insertion hole 19b1 of the heat dissipating member 19, the frame 13 and the chassis 14 will be fixed at the long side.

The shorter side outer wall 13b2 has a plate shape (wall shape) with a prescribed thickness and extends straight towards the bottom (chassis 14 side) from the outer edge portion of the shot side opposing part 13a2. The bottom edges (ends) of each shorter side outer walls 13b2 respectively have a groove (not shown) through which a screw (not shown) can be screwed in. When the screw SM is screwed to the groove while also going through screw holes (not shown), the frame 13 and the chassis 14 will be fixed at the short side.

The chassis 14 as a whole is formed of a plate shaped member with a horizontally-long rectangular shape like the liquid crystal panel 11 and the like, and is disposed on the rear side of the liquid crystal display unit LDU (liquid crystal display device 10) so as to cover the rear surface 16f of the light guide plate 16. The chassis 14 is provided with a bottom plate 14a in a rectangular plate shape, standing wall plates 14b and 14c that are formed on respective edges on the long side of the bottom plate 14a, and protruding plates 24b and 24c that protrude towards the opposite side (outside) of the standing wall plates 14b and 14c. The bottom plate 14a is a part provided on the rear surface 16f of the light guide plate 16 through the reflective sheet 20 and occupies a large portion of the chassis 14. This bottom plate 14a is in close contact with the rear surface 16f of the light guide plate 16 through the reflective sheet 20.

The standing wall plates 14b and 14c are provided on the respective sides on the long side of the bottom plate 14a so as to be in parallel with each other. The respective standing wall plates 14b and 14c is formed of a plate shaped member with a similar thickness to the bottom plate 14a. The standing wall plates 14b and 14c are formed on the bottom plate 14a so as to extend towards the side opposite (rear side) to the liquid crystal panel 11. The standing wall plates 14b and 14c have an elongated plate shape (wall shape) that extends along the longer side direction of the bottom plate 14a. As shown in FIG. 4 and the like, in the present embodiment, the standing wall plates 14b and 14c are arranged further towards the inner side (LED unit LU side) than the edge faces 16b and 16c on the long side of the light guide plate 16. Thus, the standing wall plates 14b and 14c are further inside than the edge faces 16b and 16c of the light guide plate 16. Protruding plates 24b and 24c are provided from the long side of the standing wall plates 14b and 14c away from (outwards from) the bottom plate 14a. The protruding plates 24b and 24c extend along the long side direction of the bottom plate 14a and are formed of plate shaped members with a similar thickness to the bottom plate 14a. Furthermore, the outer edge portions of the protruding plates 24b and 24c in the long side are raised respectively towards the top side (liquid crystal panel 11), the raised portions 34b and 34c being arranged on the outside of the long side outer wall 13b1.

The standing wall plate 14b, the protruding plate 24b, and the raised portion 34b have a shallow container shape that extends along the longer side direction. The container shaped portion houses the heat dissipating member 19b of the light source support member 19 that supports the LED unit LU provided in the gap S1. Furthermore, the standing wall plate 14c, the protruding plate 24c, and the raised portion 34c similarly have a shallow container shape extending along the longer side direction. The container shaped portion houses the heat dissipating member 19b of the light source support member 19 that supports the other LED unit LU that is provided in the gap S2. The protruding plate 24b and 24c is in face-to-face contact with the heat dissipating section 19b of the heat dissipating member 19. Also, as shown in FIG. 4, the protruding plates 24b and 24c face the long side opposing part 13a1. The protruding plates 24b and 24c face the long side outer wall 13b1 through the heat dissipating section 19b.

The protruding plates 24b and 24c that are arranged on the long side of the chassis 14 have large and small insertion holes 25a and 25b respectively. The large insertion hole 25a is for exposing the edge (head) of the screw SM used to fix the heat dissipating member 19 to the long side outer wall 13b1 and is formed larger than the edge (head) of the screw SM. On the other hand, the other small insertion hole 25b is for inserting the screw SM used to fix the chassis 14 to the frame 13. The chassis 14 is fixed to the frame 13 by having a screw SM inserted through the insertion hole 25b, the screw SM being inserted into the prescribed insertion hole 19b1 provided on the heat dissipating member 19 (heat dissipating section 19b) and being screwed into the groove 13d. By fixing the chassis 14 to the frame 13 in this manner, the layered objects including the liquid crystal panel 11, the optical members 15, the light guide plate 16, the reflective sheet 20, and the LED units LU that are arranged on the edge of the layered body are sandwiched between the frame 13 and the chassis 14. The chassis 14 is fixed to the frame 13 with a screw (not shown) in the short side also. Furthermore, the layered objects are sandwiched by the frame 13 and the chassis 14 in the short side as well. The contact part 13c provided on the frame 13 is formed on the non-display region 11c2 on the edge of the front side of the liquid crystal panel 11 and sandwiches the layered objects with the bottom plate 14a of the chassis 14.

The elastic member 21 is provided on the long side opposing part 13a1 of the frame 13 while being attached to the edge 19a1 of the light source support member 19. The portion of the elastic member 21 protruding towards the light guide plate 16 is located slightly farther to the inside than the edge faces 16b and 16c of the light guide plate 16. Furthermore, the elastic member 21 is facing the edge of the liquid crystal panel 11.

Here, steps to assemble respective constituting members of the liquid crystal display device 10 will be described. First, the frame 13 is disposed on a prescribed workbench. During this time, the frame 13 on the workbench has the front side facing down (workbench side), and the rear side facing up. In other words, the frame 13 is disposed upside down on the workbench. Next, the liquid crystal panel 11 is assembled to the upper side of the frame 13 on the workbench (that is, the rear side of the frame 13). During this time, the liquid crystal panel 11 is disposed such that the CF substrate 11a faces down (workbench side), and the array substrate 11b faces up. The contact part 13c of the frame 13 is provided on the non-display region 11c2 of the liquid crystal panel 11. Next, the optical members 15 are placed on the rear side (rear surface 11d side) of the liquid crystal panel 11.

Then, the light guide plate 16 is placed on the optical members 15. During this time, the light guide plate 16 is disposed such that the surface 16a on the front side to be the light exiting surface 16a faces down and the rear surface 16f faces up. Also, the edge faces (light receiving faces) 16b and 16c of the light guide plate 16 are fixed in position with respect to the outer wall 13b1 of the frame 13 such that a distance D1 between the outer wall 13b1 of the frame and the edge faces 16b and 16c of the light guide plate 16 becomes a prescribed distance. The frame 13 is provided with a positioning member (not shown) for positioning the light guide plate 16 in the prescribed location, and this positioning member is used to form gaps S1 and S2 having the distance D1 between the edge faces (light receiving faces) 16b and 16c and the outer wall 13b1. Next, the reflective sheet 20 is placed on the rear surface 16f of the light guide plate 16. Furthermore, the edges of the reflective sheet 20 are positioned so as not to protrude to the outside of the respective edge faces 16b and 16c of the light guide plate 16.

Figure 7:
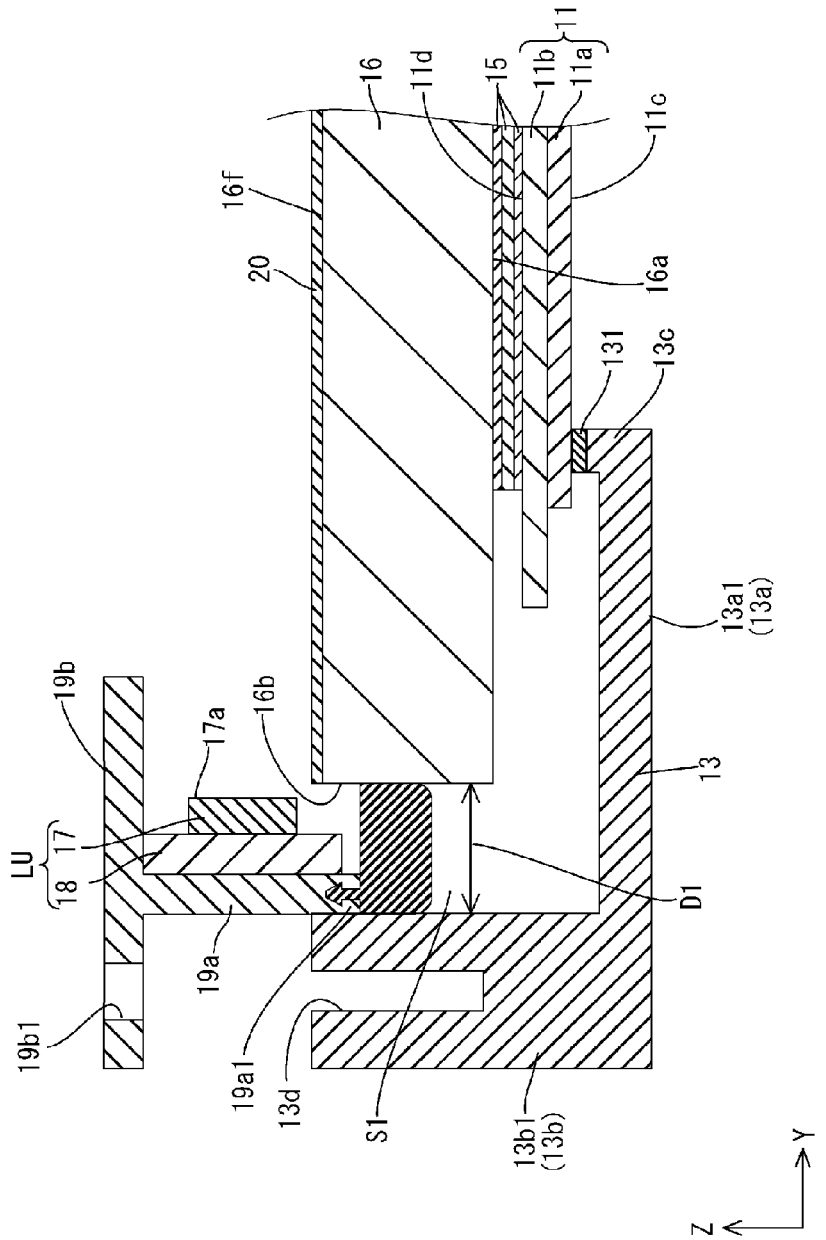
FIG. 7 is a schematic view for explaining the process of inserting the LED unit with the elastic member into a gap between the outer wall of the frame and the light receiving face of the light guide plate.

Then, the respective LED units LU are inserted from above (rear side of the light guide plate 16) into the gaps S1 and S2. FIG. 7 is a schematic view for explaining the process of inserting the LED units LU with the elastic member 21 into the gap S1 between the outer wall 13b1 of the frame 13 and the light receiving face 16b of the light guide plate 16. Here, the LED unit LU inserted in the gap S1 will be explained with reference to FIG. 7 and the like. The elastic member 21 fixed to the edge 19a1 of the light source support member 19 is inserted into the gap S1 before the LED unit LU. The width L1 (refer to FIG. 6) of the elastic member 21 is slightly larger than the distance D1 between the light receiving face 16b of the light guide plate 16 and the outer wall (an example of a wall portion) 13b1. Due to this, when the elastic member is inserted into the gap S1, the elastic member 21 is sandwiched and compressed between the outer wall 13b1 and the light receiving face 16b. Also, the elastic member 21 widens the gap between the outer wall 13b1 and the light receiving face 16b such that the distance D1 (gap S1) can be kept at the maximum distance. Furthermore, the elastic member 21 protrudes further towards the light guide plate 16 (light receiving face 16b side) even if the elastic member 21 is compressed while being inserted into the gap S1. The elastic member 21 has a chamfer 21c and thus the elastic member 21 can be inserted with ease into the small gap S1 that has a width smaller than that of the elastic member 21.

The LED attachment section 19a and the LED units LU of the light source support member 19 is inserted into the gap S1 after the elastic part 21 is inserted. During this time, the LED attachment section 19a moves towards the bottom (the opposing part 13a1 of the frame 13) along the outer wall of the frame 13. The light source support member 19 is inserted through the gap S1 until the elastic member 21 comes into contact with the opposing part 13a1 of the frame 13. When the elastic member 21 comes into contact with the opposing part 13a1, the inner portion of the heat dissipating section 19b of the light source support member 19 is placed on the rear surface 16f of the light guide plate 16, and the outer portion of the heat dissipating section 19b comes into contact with the edge of the outer wall 13b1 of the frame 13 and is placed thereon. Then, the light source support member 19 is fixed to the outer wall 13b1 with a screw. In this manner, the LED unit LU is disposed within the gap S1 so as to face the edge face (light receiving face) 16c of the light guide plate 16 with a prescribed distance kept therebetween. Furthermore, the LED units LU that are supported by the light source support member 19 are arranged in prescribed locations with the elastic member 21 for the gap S2 between the edge face 16c of the light guide plate 16 and the outer wall 13b1.

Next, the bottom plate 14a of the chassis 14 is assembled to the frame 13 while being placed on the surface 16f of the light guide plate across the reflective sheet 20. By the above-mentioned steps, the respective constituting members of the liquid crystal display unit LDU are assembled. Next, after the stand attachment member STA and various boards PWB, MB, and CTB are attached to the rear side of the liquid crystal display unit LDU, the stand ST and the cover member CV are attached to the rear side, thereby completing the liquid crystal display device 10 and the television receiver TV of the present embodiment.

When the power source of the liquid crystal display device 10 (television receiver TV) is turned ON, power is supplied from the power supply board PWB and the driving of the liquid crystal panel 11 is controlled by various signals from the control board CTB supplied to the liquid crystal panel 11, and the respective LEDs 17 forming a part of the backlight device 12 are driven. When light is emitted from the respective LEDs 17 due to driving of the respective LEDs 17, the light enters the inside of the light guide plate 16 from the light receiving faces 16b and 16c thereof. The light that has entered the light guide plate 16 progresses therethrough while being reflected and the like by the reflective sheet 20 arranged on the rear side of the light guide plate 16. This light exits from the front surface (light exiting surface) 16a of the light guide plate 16 towards the optical members 15. The light that has exited the light guide plate 16 becomes substantially uniform planar light by passing through the optical members 15 and then illuminates the rear surface of the liquid crystal panel 11. The liquid crystal panel 11 uses this planar light to perform display on the display region 11c1 of the display surface 11c.

The liquid crystal display device 10 of the present embodiment has an LED unit (light source unit) LU that is supported by the light source support member 19. Furthermore, gaps S1 and S2 are formed between the light receiving faces 16b and 16c and the wall portion 13b1 of the light guide plate 16 provided in the liquid crystal display panel 10. The LED unit (light source unit) LU and the light source support member 19 are inserted through the gaps S1 and S2 from the rear side of the light guide plate 16. The light source support member 19 is provided with the elastic member 21 made of an elastic material. The elastic members 21 protrude further toward the light receiving faces 16b and 16c than the LEDs (light source) 17, and are inserted into the gaps S1 and S2 before the LED units (light source unit) LU. Accordingly, because the elastic members 21 that protrude further towards the light receiving faces 16b and 16c than the LED (light source) 17 are inserted into the gaps S1 and S2 before the LED unit (light source unit) LU, damage that would result from the LEDs (light source) and the light receiving faces 16b and 16c coming into contact is suppressed.

Furthermore, the elastic member 21 is attached to the light source support member 19 such that when the LEDs 17 face the light receiving faces 16b and 16c, the elastic member 21 passes through the gaps S1 and S2 and is disposed to the front of the light guide plate 16. Furthermore, if the elastic member 21 is attached to the light source support member 19 such that when the LEDs 17 face the light receiving faces 16b and 16c, the elastic member 21 passes through the gaps S1 and S2 and is disposed to the front of the light guide plate 16, then the light receiving faces 16b and 16c of the light guide plate 16 are no longer covered. Therefore, the elastic member 21 is prevented from blocking the light emitted by the LEDs 17 from entering the light receiving faces 16b and 16c.

Furthermore, the elastic members 21 of the liquid crystal display device 10 of the present embodiment are arranged on the edge 19a1 of the light source support member 19. When the elastic members 21 are arranged on the edge 19a1 of the light source support member 19 towards the gaps S1 and S2, the elastic member 21 protects the edge 19a1 of the light source support member 19, and thus the edge 19a1 of the light support member 19 comes into contact with the light receiving faces 16b and 16c of the light guide plate 16 suppressing damage to the light receiving faces 16b and 16c.

Furthermore, the elastic member 21 of the liquid crystal display device 10 of the present embodiment has chamfers 21c on the side that is inserted into the gaps S1 and S2. If the elastic member 21 has the chamfers 21c on the side that is inserted into the gaps S1 and S2, the elastic member 21 can be inserted into the gaps S1 and S2 with greater ease.

Also, the elastic members 21 of the liquid crystal display device 10 of the present embodiment are sandwiched by the outer wall (wall portion) 13b1 and the light receiving faces 16b and 16c, and are configured to be wider than the gap D1 between the outer wall (wall portion) 13b1 and the light receiving faces 16b and 16c. When the elastic members 21 are sandwiched between the outer wall (wall portion) 13b1 and the light receiving faces 16b and 16c, and the widths L1 in theshorter side direction of the elastic members are set to be larger than the gaps D1 between the outer wall (wall portion) 13b1 and the light receiving faces 16b and 16c, then the gaps (clearance) between the outer wall (wall portion) 13b1 and the light receiving faces 16b and 16c can be kept to a maximum. Therefore, the LEDs 17 are further suppressed from contacting the light receiving faces 16b and 16c of the light guide plate 16.

Furthermore, in the liquid crystal display device 10 of the present embodiment, the elastic members 21 have light shielding characteristics and face the edges of the liquid crystal panel 11. When the elastic members 21 have light shielding characteristics and face the edge of the liquid crystal panel 11, the light from the LEDs 17 is suppressed from entering the edge of the liquid crystal panel 11.

<Embodiment 2>

Figure 8:
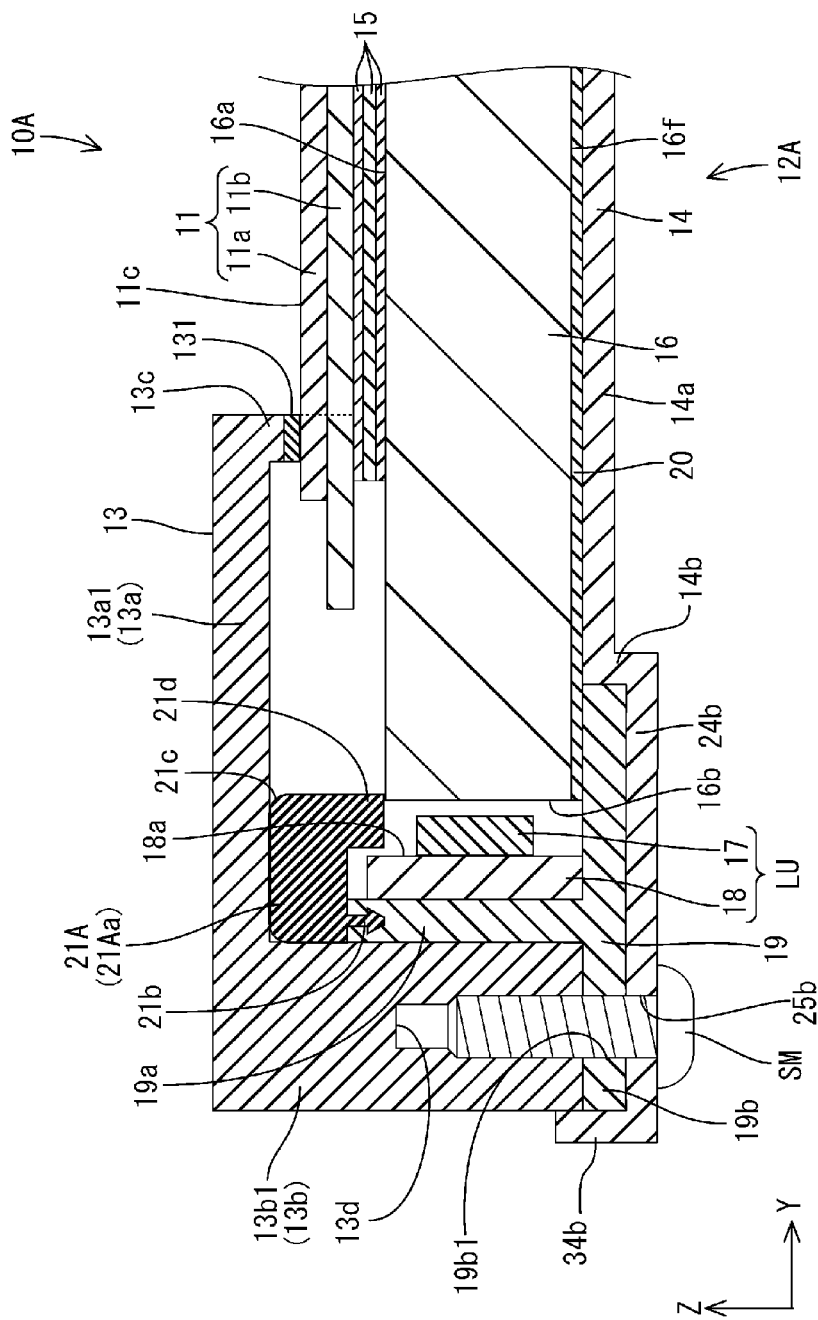
FIG. 8 is a magnified cross-sectional view of a liquid crystal display device of Embodiment 2.

Embodiment 2 of the present invention will be explained below with reference to FIG. 8. In the embodiments below, portions that are the same as those in Embodiment 1 are given the same reference characters as in Embodiment 1, and a detailed explanation thereof will be omitted. In the present embodiment, a liquid crystal display device 10A having a backlight device 12A is shown as an example. FIG. 8 shows a cross-sectional view of a liquid crystal display device 10A according to Embodiment 2. The cross-sectional configuration of the liquid crystal display device 10A shown in FIG. 8 corresponds to the cross-sectional configuration of the liquid crystal display device 10 of Embodiment 1 shown in FIG. 5. The liquid crystal display device 10A of the present embodiment uses an elastic member 21A instead of the elastic member 21 of Embodiment 1. This elastic member 21A has a portion (projection) 21d that protrudes towards the surface 16a on the front of the light guide plate 16, and this projection 21d is in contact with (is disposed on) the edge of the surface 16a. This projection 21d has an elongated shape along the longer side direction of the light source support member 19 similar to that of the main body 21Aa of the elastic member 21A. When the elastic member 21A is disposed on the surface 16a of the light guide plate 16, the leakage of light from LEDs 17 from a space between the LED attachment section 19a of the light source support member 19 and the light receiving face 16b (especially between the mounting surface 18a and the light receiving face 16b) towards the top (side of the opposing part 13a1 of the chassis 14) is suppressed. Conventionally, when light leaking from the gap enters the inner sides of the edge of the liquid crystal panel 11 or the edge of the optical members 15, sometimes uneven luminance appears as a stripe on the display surface 11c of the liquid crystal panel 11. However, the uneven luminance can be suppressed by having the elastic member 21A contact the surface 16a on the front side of the light guide plate 16 and cover the LEDs 17 from above as in the present embodiment. The elastic member 21 of Embodiment 1 can also suppress light from entering the edge and the like of the liquid crystal panel 11 to a certain degree, but when the portion (projection) 21d of the elastic member 21A is disposed on the surface 16a of the light guide plate 16, the uneven luminance can be further suppressed. The elastic member 21A of the present embodiment is also made of black hard rubber.

<Embodiment 3>

Figure 9:
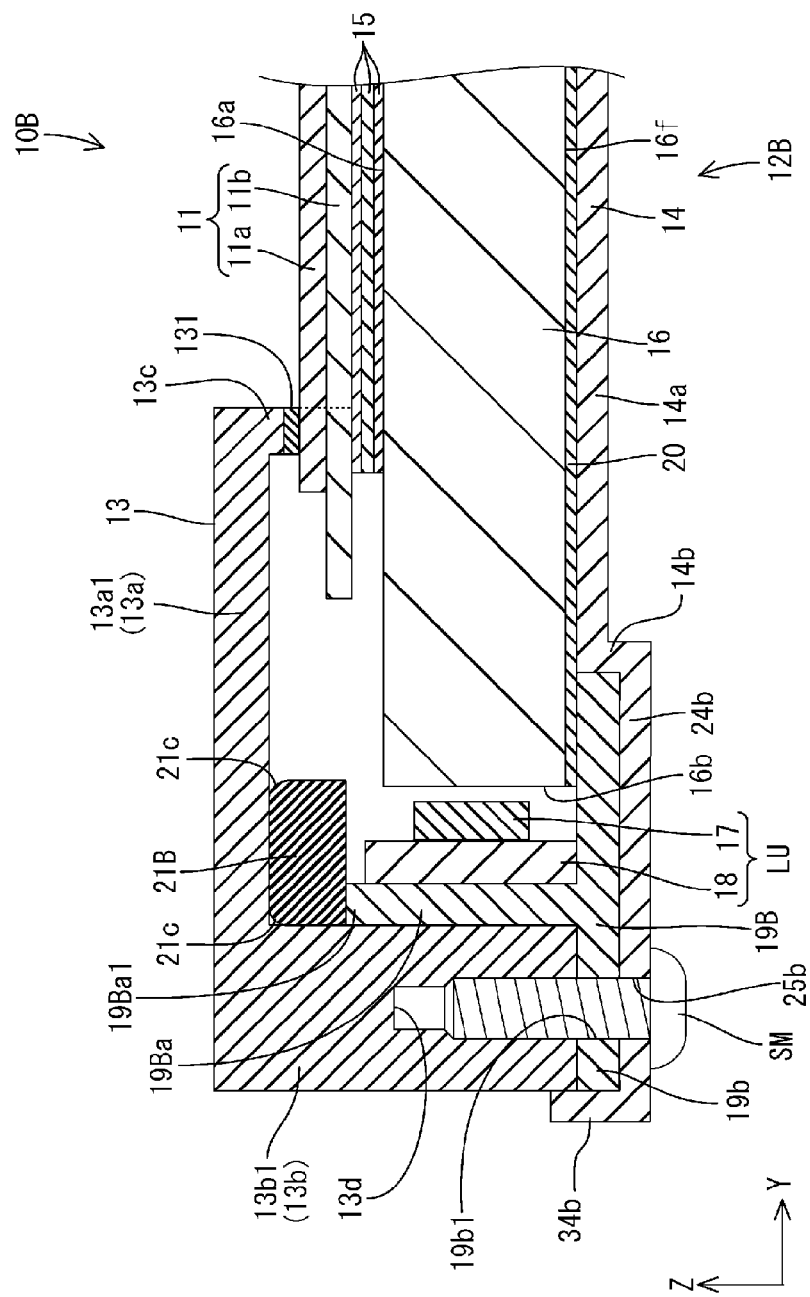
FIG. 9 is a magnified cross-sectional view of a liquid crystal display device of Embodiment 3.

Next, Embodiment 3 of the present invention will be explained with reference to FIG. 9. In the present embodiment, a liquid crystal display device 10B having a backlight device 12B is shown as an example. FIG. 9 shows a cross-sectional view of the liquid crystal display device 10B according to Embodiment 3. The cross-sectional configuration of the liquid crystal display device 10B shown in FIG. 9 corresponds to the cross-sectional configuration of the liquid crystal display device 10 of Embodiment 1 shown in FIG. 5. The liquid crystal display device 10B of the present embodiment uses an elastic member 21B instead of the elastic member 21 of Embodiment 1. As the elastic member 21B is being used, the shape of the edge 19Ba1 of the LED attachment section 19Ba of the light source support member 19B has been modified. The elastic member 21B of the present embodiment is fixed to the edge 19Ba1 of the upper side (front side) of the LED attachment section 19Ba1 by adhesive. An edge face on the bottom side of the elastic member 21B is not provided with a fixture 21b that is a projection as in Embodiment 1, and has a flat surface. Furthermore, unlike Embodiment 1, another edge 19Ba1 of the LED attachment section 19Ba is not provided with a hole 19a2, and has a flat surface. As in the present embodiment, the elastic member 21B can be fixed to the edge 19Ba1 of the light source support member 19B using an adhesive.

<Embodiment 4>

Figure 10:
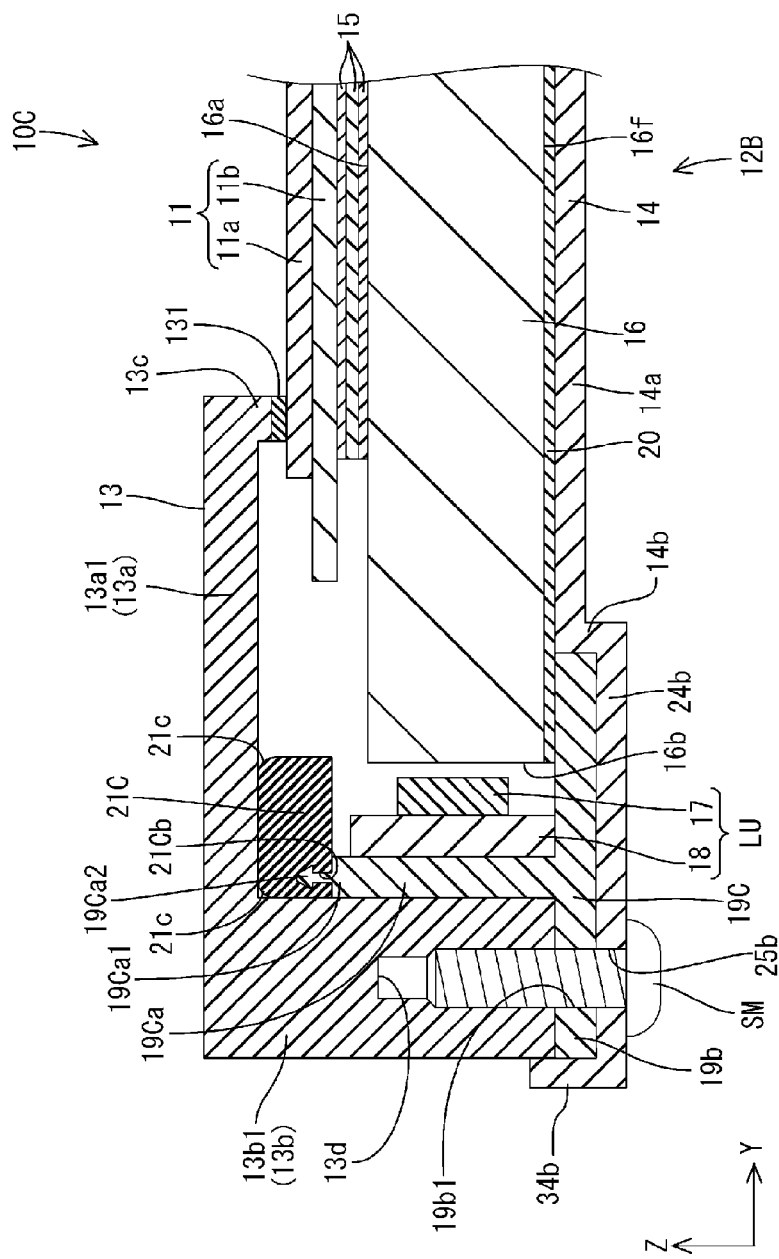
FIG. 10 is a magnified cross-sectional view of a liquid crystal display device of Embodiment 4.

Next, Embodiment 4 of the present invention will be explained with reference to FIG. 10. In the present embodiment, a liquid crystal display device 10C having a backlight device 12C is shown as an example. FIG. 10 is a cross-sectional view of a liquid crystal display device 10C according to Embodiment 4. The cross-sectional configuration of the liquid crystal display device 10C shown in FIG. 10 corresponds to the cross-sectional configuration of the liquid crystal display device 10 of Embodiment 1 shown in FIG. 5. The liquid crystal display device 10C of the present embodiment uses an elastic member 21C instead of the elastic member 21 of Embodiment 1. As the elastic member 21C is being used, the shape of the edge 19Ca1 of the LED attachment section 19Ca of the light source support member 19C has been modified. In the present embodiment, a fixture 21Cb that is a recess is formed on the side with the elastic member 21B, and a protruding portion 19Ca2, which is a projection inserted into the fixture 21Cb that is a recess, is formed on the edge 19Ca1 of the LED attachment section Ca. In other words, in the present embodiment, the engaging relationship between the elastic member 21C and the edge 19Ca2 of the LED attachment 19Ca that are attached to each other is opposite to that of other embodiments. Furthermore, the tip of the cross-sectional shape of the projection 19Ca2 is a trapezoid and the cross-sectional shape of the groove of the fixture 21Cb is also a trapezoid. The elastic member 21C may be fixed to the edge 19Ca1 (projection 19Ca2) of the LED attachment section 19Ca with the opposite engaging relationship.

<Embodiment 5>

Figure 11:
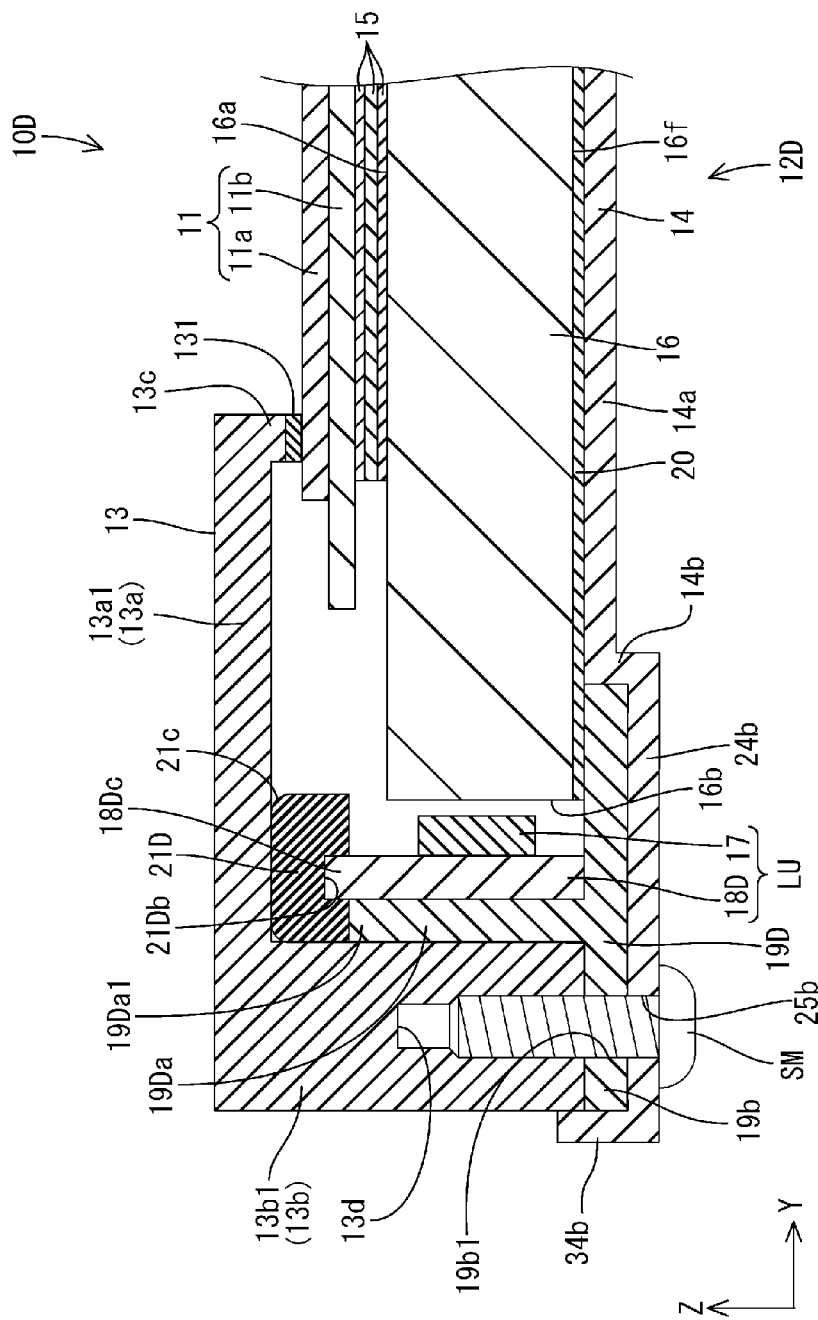
FIG. 11 is a magnified cross-sectional view of a liquid crystal display device of Embodiment 5.

Next, Embodiment 5 of the present invention will be explained with reference to FIG. 11. In the present embodiment, a liquid crystal display device 10D having a backlight device 12D is shown as an example. FIG. 11 is a cross-sectional view of the liquid crystal display device 10D according to Embodiment 5. The cross-sectional configuration of the liquid crystal display device 10D shown in FIG. 11 corresponds to the cross-sectional configuration of the liquid crystal display device 10 of Embodiment 1 shown in FIG. 5. The liquid crystal display device 10D of the present embodiment uses an elastic member 21D instead of the elastic member 21 of Embodiment 1. A groove shaped fixture 21Db that engages an edge 18Dc of an LED substrate 18D is formed on the bottom side of the elastic member 21D. The cross-section of the fixture 21Db has a recess shape that has an opening on the bottom side. Furthermore, the fixture 21Db is formed so as to be elongated along the lengthwise direction (X axis direction) of a light source support member 19D. In the case of the present embodiment, the length of the LED substrate 18D in the shorter side direction is configured to be longer than the LED substrate 18 of Embodiment 1. The LED substrate 18D is supported by the light source support member 19D, and the edge 18Dc on the upper side protrudes further up (side with an opposing part 13a1 of a frame 13) than an upper side edge 19Da1 of an LED substrate 19Da. The edge 18Dc of the protruding LED substrate 18D is inserted into the fixture 21Db of the elastic member 21D. The top surface of the edge 19Da1 of the LED attachment section 19Da is a flat surface in which a bottom side portion of the elastic member 21D is placed. As in the present Embodiment, the elastic member 21D may be attached to the light source support member 19D with the edge 18Dc of the LED substrate 18D.

<Embodiment 6>

Figure 12:
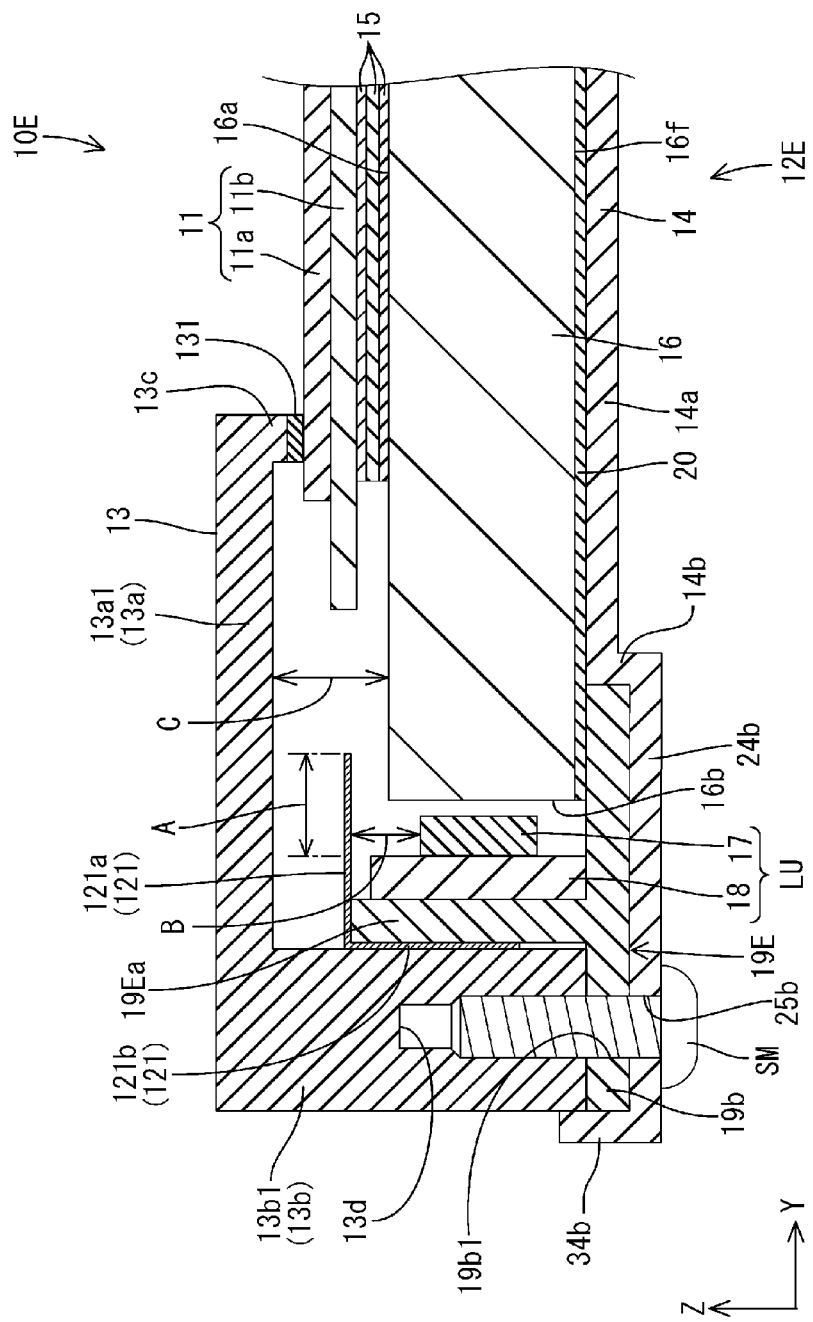
FIG. 12 is a magnified cross-sectional view of a liquid crystal display device of Embodiment 6.
Figure 13:
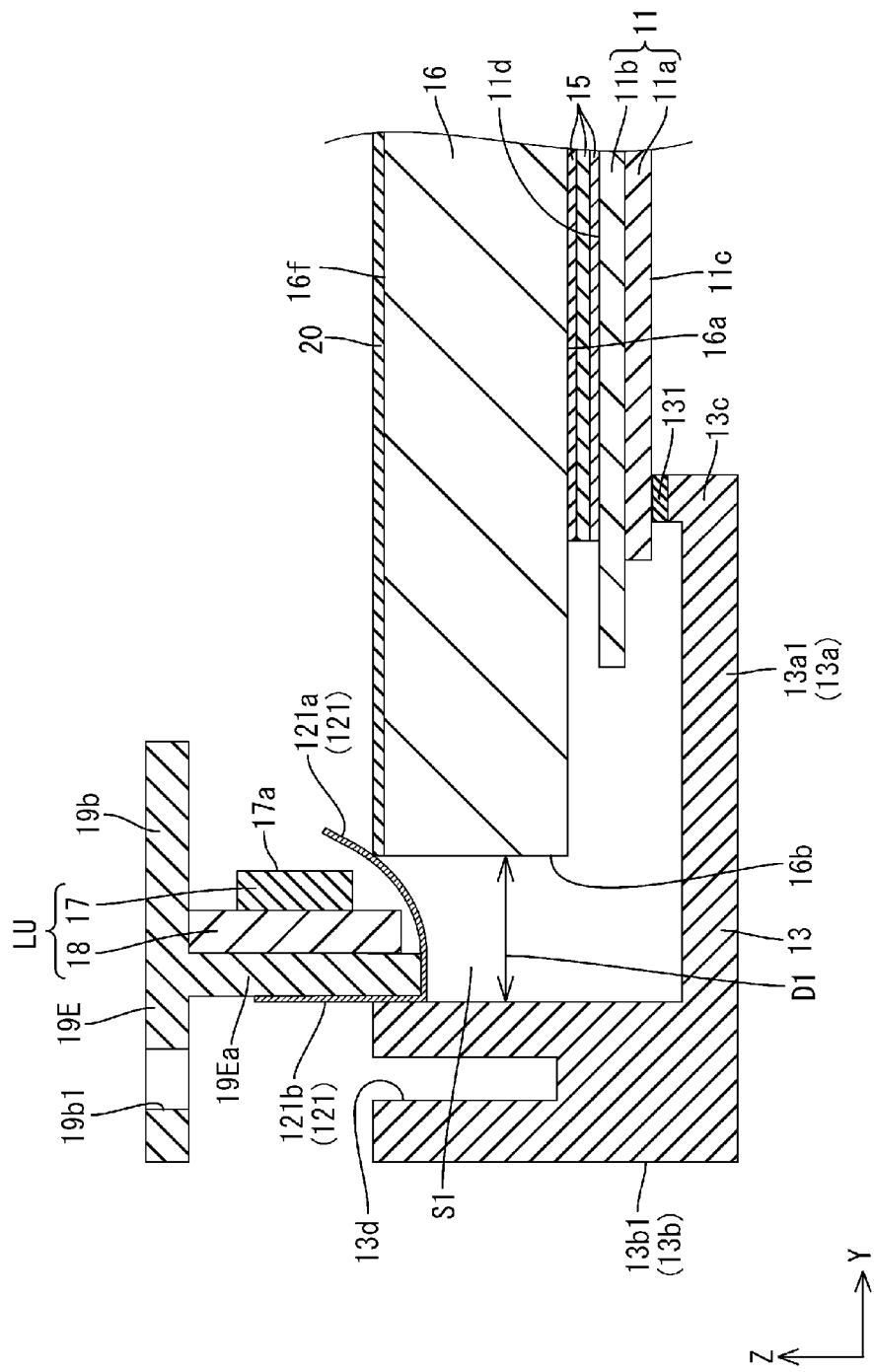
FIG. 13 is a schematic view for explaining the process of inserting the LED unit with the elastic sheet into a gap between the outer wall of the frame and the light receiving face of the light guide plate.

Next, Embodiment 6 of the present invention will be explained below with reference to FIGS. 12 and 13. In the present embodiment, a liquid crystal display device 10E having a backlight device 12E is shown as an example. FIG. 12 is a cross-sectional view of a liquid crystal display device 10E according to Embodiment 6. The cross-sectional configuration of the liquid crystal display device 10E shown in FIG. 12 corresponds to the cross-sectional configuration of the liquid crystal display device 10 of Embodiment 1 shown in FIG. 5. The liquid crystal display device 10E of the present embodiment uses an elastic sheet 121 instead of the elastic member 21 of Embodiment 1. This elastic sheet 121 is formed of a protruding sheet portion 121a that protrudes from the edge of an LED attachment section 19E1 of a light source support member 19E to the light guide plate 16 and a fixing sheet portion 121b that extends towards the bottom side (side with a heat dissipating section 19b) of the protruding sheet portion 121a that is disposed on an outer wall 13b1 and that is fixed to an LED attachment section 19Ea. The protruding sheet portion 121a and the fixing sheet portion 121b are connected at a substantially right angle. In other words, the cross-section of the elastic sheet 121 has a substantially L shape as a whole. The elastic sheet 121 is formed of one sheet shaped elastically deformable member that is folded at a prescribed portion. The material used for the elastic sheet 121 includes a plastic sheet, a paper sheet, or the like, for example. In the present embodiment, a plastic sheet is used for the elastic sheet 121.

The protruding sheet portion 121a of the elastic sheet 121 is straight when no external force is added. As a whole, the protruding sheet portion 121a has a strip-shaped (band-shaped) projecting part 142 that extends along the long side direction of the light source support member 19E. This length in the lengthwise direction is set to be substantially equal to the length of the light source support member 19E. Furthermore, the length of the protruding sheet portion 121a in the shorter side direction is configured to be longer than a distance D between the outer wall 13b1 and a light receiving face 16b of the frame 13. The edge of the protruding sheet portion 121a that protrudes toward the light guide plate 16 faces the surface 16a on the front side of the light guide plate 16 over LEDs 17 of LED units LU. A portion of the protruding sheet portion 121a that is disposed on the outer wall 13b1 side is fixed to the edge of the LED attachment section 19Ea using an adhesive or the like. A portion of the protruding sheet 121a that is disposed closer to the light guide plate 16 than the fixed portion of the protruding portion warps and elastically deforms when an external force is applied.

The fixed sheet 121b is attached to a surface on the outside (surface facing the outer wall 13b1) of the LED attachment section 19Ea using an adhesive or the like. Then, when the LED unit LU is disposed on a prescribed location in a gap S1 between the outer wall 13b1 and the light receiving face 16b, the fixed sheet portion 121b is sandwiched between the outer wall 13b1 and the LED attachment section 19Ea. Similar to the protruding sheet portion 121a, the fixed sheet portion 121b has a strip-shape (band-shape) that extends along the long side direction of the light source support member 19E. The length (length in the X axis direction) of the shorter side direction of the fixed sheet portion 121b is configured to be shorter than the LED attachment section.

FIG. 12 is a schematic view for explaining the process of inserting the LED units LU with the elastic member 21 into the gap S1 between the outer wall 13b1 of the frame 13 and the light receiving face 16b of the light guide plate 16. Here, the process of arranging the LEDs LU in the gap S1 will be described. As shown in FIG. 12, the LED units LU supported by the light source support member 19E are inserted from the rear side of the light guide plate 16. During this time, the pro-elastic sheet 121 attached to the light source member 19E is inserted into the gap S1 before the LED unit LU. When the elastic sheet 121 of the protruding sheet portion 121a is inserted into the gap S1, the protruding portion protruding towards the light guide plate 16 is curved by the boundary portion or the like between the light receiving face 16b and the rear surface 16f. Then, as the elastic sheet 121 moves towards the opposing part 13a1 (towards the bottom) of the frame 13 through the gap S1, the edge of the protruding sheet portion 121a warps further, and is interposed between the end face 17a of the LEDs 17 and the light receiving face 16b. Therefore, at the time the LED units LU are being inserted, the end face 17a of the LEDs 17 is protected by the protruding sheet portion 121a of the elastic sheet 121. The LED unit LU that is supported by the light source support member 19E is inserted into the gap S1 along the outer wall 13b1 of the LED attachment section 19Ea (fixed sheet portion 121b). When the LED unit LU is inserted into the gap S1, and the LEDs 17 are arranged on the location facing (opposing) the light receiving face 16b, the portion of the heat dissipating section 19b of the light source support member 19E that protrudes inward is placed on the rear surface 16f of the light guide plate 16 across the reflective sheet 20, and the portion protruding to the outside of the heat dissipating section 19b reaches the edge of the outer wall 13b1 and is placed thereon. When the LEDs 17 are disposed in prescribed locations facing the light receiving face 16b, the protruding sheet portion 121a of the elastic sheet 121 passes through the gap S1 and extends so as to be straight. Also, the LED unit LU having the elastic sheet 121 is similarly inserted into the gap S2 formed between the edge face 16c opposite to the edge face 16b, and the outer wall 13b1, while the LED unit LU is being supported by the light source support member 19E.

As shown in FIG. 12, the length (length along the Y axis direction) of the LED substrate 18 between the protruding sheet portion 121a and the edge is assigned the reference character A. The length (length along the Z axis direction) between the top of the LEDs 17 and the protruding sheet portion 121a disposed over the LEDs is assigned the reference character B. The length (length along the Z axis direction) between the surface 16a on the front side of the light guide plate 16 and the opposing part 13a1 of the frame 13 is assigned the reference character C. In the present embodiment, the length A is set to be longer than the length B. By setting the respective lengths A and B in this manner, the end faces 17a of the LEDs 17 and the protruding sheet portion 121a can be protected when the LED unit LU is inserted into the gap S1. Furthermore, the length C is set to be longer than the length A. By setting the respective lengths A and C in this manner, the protruding sheet portion 121a can be restored to its original straight state when passing through the gap S1 when the LED unit LU is inserted into the gap S1 and the LEDs 17 oppose (face) each other.

The liquid crystal display device 10E is provided with an LED unit (light source unit) LU that has LEDs (light source) 17m and an LED substrate (light source substrate) 18 on which the LEDs 17 are mounted on. The LED unit LU is supported by the light source support member 19E. Furthermore, gaps S1 and S2 are formed between the light receiving faces 16b and 16c and the outer wall (wall portion) 13b1 of the light guide plate 16 provided in the liquid crystal display device 10E. The light source support member 19E is provided with elastic sheets 121 made of elastically deformable sheet shaped members. The elastic members 121 protrude further toward the light receiving faces 16b and 16c than the LEDs (light source) 17, and are inserted into the gaps S1 and S2 before the LED units LU. Then, the elastic sheets 121 (protruding sheet portion 121a) bend such that the sheets are interposed between the LEDs (light source) and the light receiving faces 16b and 16c in the gaps S1 and S2. Therefore, in the case of the liquid crystal display device 10E, the elastic sheets 121 protruding further towards the light receiving faces 16b and 16c than the LEDs 17 are inserted into the gaps S1 and S2, and then, because the sheets are interposed between the LEDs 17 and the light receiving faces 16b and 16c, the LEDs (light source) 17 are suppressed from coming into contact with the light receiving faces 16b and 16c and causing damage.

Furthermore, the elastic members 121 are attached to the light source support members 19E such that when the LEDs 17 face (oppose) the light receiving faces 16b and 16c, the elastic member passes through the gaps S1 and S2 and is disposed on the front side of the light guide plate 16. If the elastic sheets 121 are attached to the light source support members 19E such that when the LEDs 17 face (oppose) the light receiving faces 16b and 16c, then the portions of the light receiving faces 16b and 16c of the light guide plate 16 covered by the elastic sheets 121 (protruding sheet portions 121a) are no longer present. Therefore, the elastic sheets 121 (protruding sheet portions 121a) are suppressed from blocking the light of the LEDs 17 from entering the light receiving faces 16b and 16c.

Furthermore, the liquid crystal display device 10E of the present embodiment has elastic sheets 121 fixed on the edge side of the light source support member 19E where the elastic sheets 121 are inserted into the gaps S1 and S2. When the elastic sheets 121 (protruding sheet portions 121a) are arranged on the edges of the light source support members 19E that are inserted into the gaps S1 and S2, the edges (edges of the LED attachment sections 19Ea) are protected by the elastic sheets 121 (protruding sheet portions 121a). As a result, damage to the light receiving faces 16b and 16c resulting from the edge of the light source support member 19E and the light receiving faces 16b and 16c coming into contact is suppressed.

<Embodiment 7>

Figure 14:
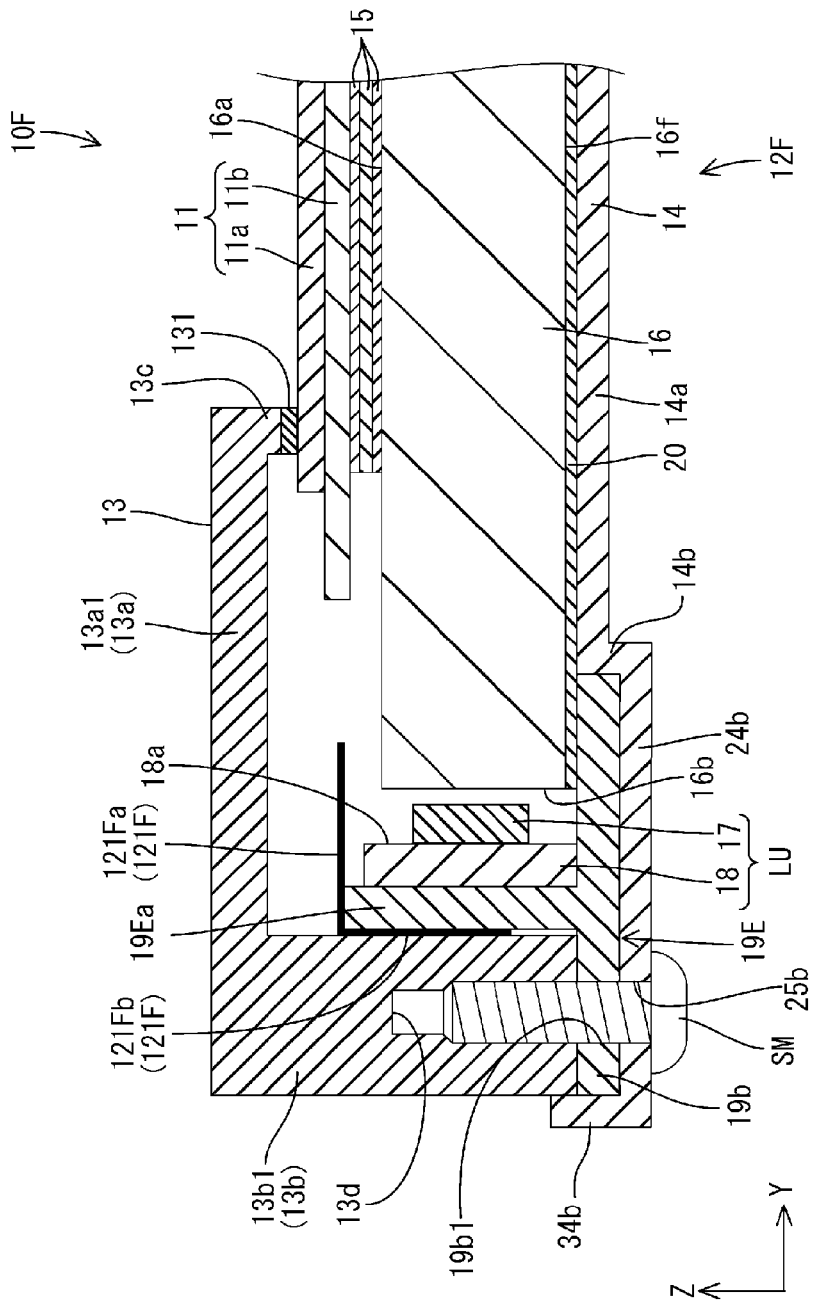
FIG. 14 is a magnified cross-sectional view of a liquid crystal display device of Embodiment 7.

Next, Embodiment 7 of the present invention will be explained with reference to FIG. 14. In the present embodiment, a liquid crystal display device 10F having a backlight device 12F is shown as an example. FIG. 14 is a cross-sectional view of the liquid crystal display device 10F according to Embodiment 7. The cross-sectional configuration of the liquid crystal display device 10F shown in FIG. 14 corresponds to the cross-sectional configuration of the liquid crystal display device 10E of Embodiment 6 shown in FIG. 12. The liquid crystal display device 10F of the present embodiment uses elastic sheets 121F with light shielding characteristics instead of the elastic sheets 121 of Embodiment 6. Furthermore, the elastic members 121F are black and have light shielding characteristics (light absorbing characteristics). Furthermore, the elastic sheets 121F are constituted of a protruding sheet portion 121Fa and a fixed sheet portion 121Fb. The size (shape) of the elastic sheets 121F is equal to the size of the elastic sheets 121 of Embodiment 6. The elastic sheets 121F may have light shielding characteristics as in the liquid crystal display device 10F of the present embodiment. If the elastic sheets 121F have light shielding characteristics, the elastic sheet 121F can suppress light from leaking outside (upper side) from between a light receiving face 16b and an LED unit LU (between the LED attachment member 19Ea and a light receiving face 16b). As a result, the display surface 11c of the liquid crystal panel 11 is suppressed from forming a stripe-shaped uneven luminance due to light from the LEDs 17 entering from the edge of the liquid crystal panel 11 and the edge of the optical members 15 towards the inside.

<Other Embodiments>

The present invention is not limited to the embodiments shown in the drawings and described above, and the following embodiments are also included in the technical scope of the present invention, for example.

(1) The embodiments mentioned above have a gap between the outer wall of the frame and the light receiving face of the light guide plate, but other embodiments may have the gap formed between the light guide plate and the wall portion provided to the inside of the outer wall of the frame or the wall portion of other members (chassis, for example). In other words, the wall portion forming a gap with the light receiving face is not limited to being the outer wall of the frame.

(2) The light source support members of the above-mentioned embodiments have an LED attachment section (light source attachment section) where the LED substrate (light source substrate) is attached, and a heat dissipating section provided on the surface on the rear side of the light guide plate, the heat dissipating section extending from the LED attachment section (light source attachment section) to the light receiving face of the light guide plate. If a portion of the light source support member is provided on a surface on the rear side of the light guide plate, an LED unit (light source unit) supported by the light source support member cannot be attached to the frame before the light guide plate when assembling the liquid crystal display device. Thus, the LED unit was attached after the light guide plate and the like are attached to the frame side as in the respective embodiments. Furthermore, even if the light source support member that supports the LED unit does not have a portion attached to the rear side of the light guide plate, as in the respective embodiments, the light guide plate and the like may be first attached to the frame with the LED unit then being inserted into the gap between the wall portion and the light receiving face.

(3) In Embodiment 1 and the like, the elastic member was set to be larger than the gap (distance) between the wall portion and the light receiving portion, but the size of the elastic member may be set to be smaller. Even in this case, the elastic member protrudes farther towards the light guide plate than the LEDs of the LED unit, and thus damage to the LEDs from the light receiving face of the light guide plate coming into contact with the LEDs is suppressed.

(4) In Embodiment 1, the elastic member was configured to be disposed on the opposing part of the frame when the LEDs of the LED unit face the light receiving face, but in other embodiments, the elastic member is not disposed on the opposing part of the frame.

(5) For the above-mentioned Embodiment 6 and the like, the elastic sheet is formed of the protruding sheet portion and the fixed sheet portion, but in other embodiments, as long as the elastic sheet can be fixed to the light source support member, a portion equivalent to the protruding sheet portion can be used.

(6) In the above-mentioned embodiment, LEDs are shown as an example of a light source, but in other embodiments, a light source other than LEDs can be used.

(7) In the other embodiments, the number and location of LED substrates provided, the number and location of the LEDs provided on the LED substrate, and the like can be appropriately changed.

(8) In the respective embodiments above, an example was shown in which the device is placed upright with the shorter side direction of the liquid crystal panel and the chassis corresponding to the vertical direction, but a configuration in which the device is placed upright with the longer side direction of the liquid crystal panel and the chassis corresponding to the vertical direction is also included in the present invention.

(9) In the above-mentioned embodiments, TFTs were used as the switching elements for the liquid crystal display device, but the present invention can be applied to other switching elements (thin-film diodes (TFDs), for example) can be, and the present invention can be applied to liquid crystal display devices that display black and white and not just liquid crystal display devices that display color.

(10) In the respective embodiments above, a liquid crystal display device using a liquid crystal panel as a display panel was described as an example, but the present invention can be applied to a display device that uses another type of display panel.

(11) In the respective embodiments above, the television receiver having a tuner was described, but the present invention can also be applied to a display device that does not have a tuner.

(12) Other embodiments may be configured so as to not have optical members or a reflective sheet.

Description of Reference Characters 10 liquid crystal display device (display device)
11 liquid crystal panel (display panel)
12 backlight device (illumination device)
13 frame
13a opposing part
13a1 long side opposing part
13a2 short side opposing part
13b outer wall (wall portion)
13b1 long side outer wall
13b2 short side outer wall
13c contact part
14 chassis
14a bottom plate
14b, 14c standing wall plates
24b, 24c protruding plate
15 optical members
16 light guide plate
16a front surface (light exiting surface)
16b, 16c long side edge face (light receiving face)
16d, 16e short side edge face
16f rear surface
17 LED (light source)
18 LED substrate (light source substrate)
19 heat dissipating section (light source support member)
20 reflective sheet
21, 21A, 21B, 21D elastic member
121, 121F elastic sheet
S1, S2 gap
TV television receiver

What is claimed is:

1. A display device, comprising:
a light source unit having a light source and a light source substrate on which the light source is mounted;
a display panel having a display surface on a front side thereof;
a light guide plate that is a plate shaped member disposed on a rear side of the display panel, the light guide plate having a light receiving face at an edge thereof that receives light emitted by the light source, and a light exiting surface on a front side thereof emitting light that has entered from the light receiving face towards the rear side of the display panel;
a wall portion facing the light receiving face of the light guide plate with a gap therebetween;
a light source support member that supports the light source unit, the light source support member being inserted into the gap between the wall portion and the light receiving face from a rear side of the light guide plate together with the light source unit; and
an elastic member made of an elastic material disposed on the light source support member at a location above the light source, the elastic member being configured to protrude farther toward the light receiving face than the light source when the elastic member is inserted through and in the gap to prevent the light source from contacting the light receiving face while the elastic member is in the gap.

2. The display device according to claim 1, wherein the elastic member is disposed on the light source support member so as to be above a plane defined by the light exiting surface of the light guide plate when the elastic member is inserted through said gap between the wall portion and the light receiving face and the light source faces the light receiving face.

3. The display device according to claim 1, wherein the elastic member is disposed on an edge of the light source support member that is inserted into said gap.

4. The display device according to claim 1, wherein the elastic member has a chamfer on a side inserted into said gap.

5. The display device according to claim 1, wherein the elastic member is configured to be sandwiched between the wall portion and the light receiving face when the elastic member is in the gap, the elastic member being formed so as to be wider than a distance between the wall portion and the light receiving face.

6. The display device according to claim 1, wherein the elastic member has light shielding characteristics and faces an edge of the display panel.

7. A display device, comprising:
a light source unit having a light source and a light source substrate on which the light source is mounted;
a display panel having a display surface on a front side thereof;
a light guide plate that is a plate shaped member disposed on a rear side of the display panel, the light guide plate having a light receiving face at an edge thereof that receives light emitted by the light source, and a light exiting surface on a front side thereof emitting light that has entered from the light receiving face towards the rear side of the display panel;
a wall portion facing the light receiving face of the light guide plate with a gap therebetween;
a light source support member that supports the light source unit, the light source support member being inserted into the gap between the wall portion and the light receiving face from a rear side of the light guide plate together with the light source unit; and
an elastic sheet formed of a sheet shaped member that is elastically deformable, disposed on the light source support member at a location above the light source, the elastic sheet being configured to extend farther towards the light receiving face of the light guide plate than the light source when the elastic sheet is being inserted through and in the gap causing the elastic sheet to bend and contact the light receiving face, to prevent the light source from contacting the light receiving face while the elastic sheet is in the gap.

8. The display device according to claim 7, wherein the elastic sheet is disposed on the light source support member so as to be above a plane defined by the light exiting surface of the light guide plate when the elastic member is inserted through said gap between the wall portion and the light receiving face and the light source faces the light receiving face.

9. The display device according to claim 7, wherein the elastic sheet is disposed on an edge of the light source support member that is inserted into said gap.

10. The display device according to claim 7, wherein the elastic sheet has light shielding characteristics.

11. The display device according to claim 1, further comprising a frame that includes a contact part disposed on a periphery of the display surface of the display panel, an opposing portion that extends horizontally farther outward from the contact part than the light receiving face of the light guide plate, and an outer wall extending downwardly from the opposing portion, said outer wall including said wall portion.

12. The display device according to claim 1, further comprising an optical member interposed between the display panel and the light guide plate, the optical member allowing the light emitted from the light exiting surface of the light guide plate to pass through to the display panel.

13. The display device according to claim 1, wherein the light source support member has a light source attachment section where the light source substrate is attached, and a heat dissipating section that extends from the light source attachment section towards an area under the light guide plate so as to be disposed on a rear surface of the light guide plate.

14. The display device according to claim 1, wherein the display panel is a liquid crystal panel having liquid crystal sealed between a pair of substrates.

15. A television receiver, comprising the display device according to claim 1.

16. The display device according to claim 7, further comprising a frame that includes a contact part disposed on a periphery of the display surface of the display panel, an opposing portion that extends horizontally farther outward from the contact part than the light receiving face of the light guide plate, and an outer wall extending downwardly from the opposing portion, said outer wall including said wall portion.

17. The display device according to claim 7, further comprising an optical member that is interposed between the display panel and the light guide plate, the optical member allowing the light emitted from the light exiting surface of the light guide plate to pass through to the display panel.

18. The display device according to claim 7, wherein the light source support member has a light source attachment section where the light source substrate is attached, and a heat dissipating section that extends from the light source attachment section towards an area under the light guide plate so as to be disposed on a rear surface of the light guide plate.

19. The display device according to claim 7, wherein the display panel is a liquid crystal panel having liquid crystal sealed between a pair of substrates.

20. A television receiver, comprising the display device according to claim 7.

* * * * *